US010518769B2

(12) United States Patent
Sen et al.

(10) Patent No.: US 10,518,769 B2
(45) Date of Patent: Dec. 31, 2019

(54) VEHICLE CONTROL SYSTEM, TRAFFIC INFORMATION SHARING SYSTEM, VEHICLE CONTROL METHOD, AND VEHICLE CONTROL PROGRAM

(71) Applicant: HONDA MOTOR CO., LTD., Tokyo (JP)

(72) Inventors: Naoto Sen, Wako (JP); Masahiko Asakura, Wako (JP); Masaaki Abe, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 14 days.

(21) Appl. No.: 15/597,363

(22) Filed: May 17, 2017

(65) Prior Publication Data
US 2017/0334441 A1 Nov. 23, 2017

(30) Foreign Application Priority Data
May 19, 2016 (JP) ................. 2016-100634

(51) Int. Cl.
*B60W 30/09* (2012.01)
*B60W 10/20* (2006.01)
(Continued)

(52) U.S. Cl.
CPC ............ *B60W 30/09* (2013.01); *B60W 10/20* (2013.01); *B60W 30/0956* (2013.01);
(Continued)

(58) Field of Classification Search
CPC .. B60W 30/09; B60W 50/14; B60W 30/0956; B60W 50/082; B60W 10/20;
(Continued)

(56) References Cited

U.S. PATENT DOCUMENTS 10,089,868 B1 * 10/2018 Hayward ............... G08G 1/166
2016/0104376 A1 * 4/2016 Fowe .................. G08G 1/0112
701/119
(Continued)

FOREIGN PATENT DOCUMENTS

CN 103970084 A 8/2014
CN 104837705 A 8/2015
(Continued)

OTHER PUBLICATIONS

Office Action dated Jan. 16, 2018, issued in counterpart Japanese Application No. 2016-100634, with English machine translation. (6 pages).
(Continued)

*Primary Examiner* — Nga X Nguyen
(74) *Attorney, Agent, or Firm* — Westerman, Hattori, Daniels & Adrian

(57) ABSTRACT

A vehicle control system includes: a surroundings information acquisition section configured to acquire vehicle surroundings information; an automated driving controller configured to execute automated driving in which at least one of speed control or steering control is controlled automatically based on the vehicle surroundings information acquired by the surroundings information acquisition section; a communication section configured to directly or indirectly communicate with another device; and a communication controller configured to transmit the vehicle surroundings information and information indicating an execution status of the automated driving to the other device using the communication section.

17 Claims, 16 Drawing Sheets

(51) Int. Cl.

| | | |
|---|---|---|
| *B60W 30/095* | (2012.01) | |
| *B60W 50/08* | (2012.01) | |
| *B60W 50/14* | (2012.01) | |
| *G05D 1/02* | (2006.01) | |
| *G08G 1/01* | (2006.01) | |
| *G08G 1/09* | (2006.01) | |
| *G08G 1/16* | (2006.01) | |
| *H04L 29/08* | (2006.01) | |
| *G08G 1/0968* | (2006.01) | |

(52) U.S. Cl.
CPC ......... *B60W 50/082* (2013.01); *B60W 50/14* (2013.01); *G05D 1/0223* (2013.01); *G05D 1/0289* (2013.01); *G08G 1/012* (2013.01); *G08G 1/0112* (2013.01); *G08G 1/0133* (2013.01); *G08G 1/0141* (2013.01); *G08G 1/091* (2013.01); *G08G 1/09685* (2013.01); *G08G 1/096816* (2013.01); *G08G 1/096827* (2013.01); *G08G 1/163* (2013.01); *G08G 1/164* (2013.01); *G08G 1/165* (2013.01); *G08G 1/166* (2013.01); *G08G 1/167* (2013.01); *H04L 67/12* (2013.01); *B60W 2050/146* (2013.01); *B60W 2420/42* (2013.01); *B60W 2420/52* (2013.01); *B60W 2510/08* (2013.01); *G05D 2201/0213* (2013.01)

(58) Field of Classification Search
CPC ......... B60W 2510/08; B60W 2420/52; B60W 2420/42; B60W 2050/146; G08G 1/167; G08G 1/166; G08G 1/165; G08G 1/164; G08G 1/09685; G08G 1/096827; G08G 1/096816; G08G 1/0112; G08G 1/091; G08G 1/012; G08G 1/163; G08G 1/0133; G08G 1/0141; H04L 67/12; G05D 1/0289; G05D 1/0223; G05D 2201/0213

See application file for complete search history.

(56) References Cited

U.S. PATENT DOCUMENTS

2018/0203455 A1* 7/2018 Cronin ................. B60W 50/14
2019/0039627 A1* 2/2019 Yamamoto .......... G05D 1/0061

FOREIGN PATENT DOCUMENTS

| CN | 104973071 A | 10/2015 |
|---|---|---|
| JP | 2016-65938 A | 4/2016 |
| WO | 2011/158347 A1 | 12/2011 |

OTHER PUBLICATIONS

Search Report dated Feb. 1, 2019, issued in counterpart CN Application No. 2017102879638 (2 pages).

Office Action dated Feb. 19, 2019, issued in counterpart CN Application No. 201710287963.8, with English translation (15 pages).

Office Action dated Jul. 15, 2019, issued in counterpart CN Application No. 201710287963.8, with English translation (15 pages).

Chinese Office Action dated Oct. 25, 2019, issued in counterpart Chinese Patent Application No. 201710287963.8 with English translation. (15 pages.)

\* cited by examiner

188

| DRIVING MODE<br>NON-DRIVING<br>OPERATION SYSTEM | MANUAL DRIVING MODE | AUTOMATED DRIVING MODE | | | ... |
|---|---|---|---|---|---|
| | | MODE A | MODE B | MODE C | |
| NAVIGATION OPERATION | NOT PERMITTED | PERMITTED | PERMITTED | NOT PERMITTED | ... |
| CONTENT PLAYBACK OPERATION | NOT PERMITTED | PERMITTED | NOT PERMITTED | NOT PERMITTED | ... |
| INSTRUMENT PANEL OPERATION | NOT PERMITTED | PERMITTED | PERMITTED | PERMITTED | ... |
| ... | ... | ... | ... | ... | ... |

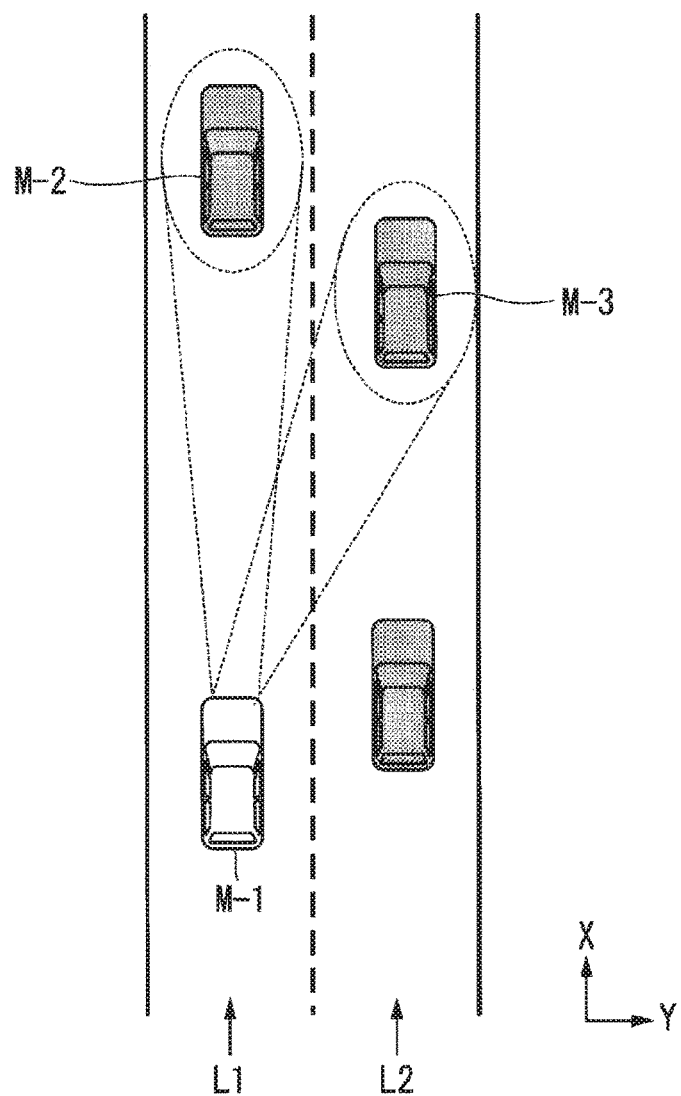

| VEHICLE IDENTIFYING INFORMATION | POSITION INFORMATION | AUTOMATED DRIVING EXECUTION STATUS |
|---|---|---|
| VEHICLE M-1 | (x, y) | AUTOMATED DRIVING (MODE A) |
| VEHICLE M-2 | (x+3, y) | |
| VEHICLE M-3 | (x+2, y+2) | |

| VEHICLE IDENTIFYING INFORMATION | POSITION INFORMATION | AUTOMATED DRIVING EXECUTION STATUS |
|---|---|---|
| VEHICLE M-2 | (x, y) | AUTOMATED DRIVING (MODE B) |
| VEHICLE M-1 | (*+*, *) | |
| VEHICLE M-3 | (*+*, *+*) | |

⋮

| VEHICLE IDENTIFYING INFORMATION | POSITION INFORMATION | AUTOMATED DRIVING EXECUTION STATUS |
|---|---|---|
| VEHICLE M-3 | (x, y) | MANUAL DRIVING |
| VEHICLE M-1 | (*+*, *) | |
| VEHICLE M-2 | (*+*, *+*) | |

| ROAD LINK | 0001 | 0001 | 0002 | |
|---|---|---|---|---|
| LANE INFORMATION | 01 | 02 | 03 | |
| DIRECTION OF TRAVEL | N | N | E | W |
| NUMBER OF VEHICLES | * | * | * | * |
| CURRENTLY EXECUTING AUTOMATED DRIVING (%) | * | * | * | * |
| CURRENTLY EXECUTING MANUAL DRIVING (%) | * | * | * | * |
| VEHICLE IDENTIFYING INFORMATION | *, * | * | *, * | * |

VEHICLE CONTROL SYSTEM, TRAFFIC INFORMATION SHARING SYSTEM, VEHICLE CONTROL METHOD, AND VEHICLE CONTROL PROGRAM

CROSS REFERENCES TO RELATED APPLICATIONS

The present application claims priority under 35 U.S.C. § 119 to Japanese Patent Application No. 2016-100634, filed May 19, 2016, entitled "Vehicle Control System, Traffic Information Sharing System, Vehicle Control Method, and Vehicle Control Program." The contents of this application are incorporated herein by reference in their entirety.

TECHNICAL FIELD

The present disclosure relates to a vehicle control system, a traffic information sharing system, a vehicle control method, and a vehicle control program.

BACKGROUND

A related system includes a device that transmits position information of a vehicle, and a device that collects position information of other vehicles and provides traffic information relating to congestion, traffic restrictions, and the like. Recently, moreover, research into technology to control vehicle travel automatically (referred to hereafter as automated driving) is progressing (see, for example, International Publication No. 2011/158347).

SUMMARY

In a world in which automated driving is being put into practice, sometimes information relating only to congestion, traffic restrictions, and the like is insufficient.

The present application provides, for example, a vehicle control system, a traffic information sharing system, a vehicle control method, and a vehicle control program capable of sharing information having greater utility.

A first aspect of the disclosure describes a vehicle control system including: a surroundings information acquisition section configured to acquire vehicle surroundings information; an automated driving controller configured to execute automated driving in which at least one of speed control or steering control is controlled automatically based on the vehicle surroundings information acquired by the surroundings information acquisition section; a communication section configured to directly or indirectly communicate with another device; and a communication controller configured to transmit the vehicle surroundings information and information indicating an execution status of the automated driving to the other device using the communication section.

In a second aspect of the disclosure, in the vehicle control system according to the first aspect, configuration may be made further including a processor configured to render traffic information by processing information transmitted from another vehicle installed with one of the other devices and received by the communication section. The received information includes surroundings information for the other vehicle and information indicating an execution status of automated driving in the other vehicle.

In a third aspect of the disclosure, in the vehicle control system according to the second aspect, configuration may be made further including a display section configured to display an image based on traffic information rendered by the processor.

In a fourth aspect of the disclosure, in the vehicle control system according to the second aspect or the third aspect, configuration may be made wherein the automated driving controller executes automated driving by controlling the at least one of speed control or steering control automatically based on traffic information rendered by the processor.

In a fifth aspect of the disclosure, in the vehicle control system according to any one of the second aspect to the fourth aspect, configuration may be made further including a route determination section configured to determine a route to a set destination based on traffic information rendered by the processor.

A sixth aspect of the disclosure describes a traffic information sharing system including: the vehicle control system according to the first aspect; and a server device including a server-side vehicle communication section configured to receive information transmitted by the vehicle control system, and a server-side processor configured to render traffic information by processing the information acquired by the server-side vehicle communication section, and to transmit the rendered traffic information to the server-side vehicle communication section.

In a seventh aspect of the disclosure, in the traffic information sharing system according to the sixth aspect, configuration may be made wherein the vehicle control system further includes a display section configured to display an image based on traffic information transmitted by the server-side vehicle communication section.

In an eighth aspect of the disclosure, in the traffic information sharing system according to the sixth aspect or the seventh aspect, configuration may be made wherein the automated driving controller executes automated driving by controlling the at least one of speed control or steering control automatically based on traffic information transmitted by the server-side vehicle communication section.

In a ninth aspect of the disclosure, in the traffic information sharing system according to any one of the sixth aspect to the eighth aspect, configuration may be made wherein the vehicle control system further includes a route determination section configured to determine a route to a set destination based on traffic information transmitted by the server-side vehicle communication section.

A tenth aspect of the disclosure describes a vehicle control method executed by an on-board computer, the method including: executing automated driving in which at least one of speed control or steering control is controlled automatically based on vehicle surroundings information acquired by a surroundings information acquisition section configured to acquire the vehicle surroundings information; and using a communication section configured to directly or indirectly communicate with another device to transmit the vehicle surroundings information and information indicating an execution status of the automated driving to the other device.

An eleventh aspect of the disclosure describes a vehicle control program for causing an on-board computer to execute processing, the processing including: executing automated driving in which at least one of speed control or steering control is controlled automatically based on vehicle surroundings information acquired by a surroundings information acquisition section configured to acquire the vehicle surroundings information; and using a communication section configured to directly or indirectly communicate with another device to transmit the vehicle surroundings information and information indicating an execution status of the automated driving to the other device.

The first, second, sixth, tenth, and eleventh aspects of the disclosure are, for example, capable of sharing information with high utility, including the vehicle surroundings information and the information indicating the automated driving execution status.

In the third and seventh aspects of the disclosure, for example, information with high utility, including position information, vehicle surroundings information, and information indicating the automated driving execution status is displayed on a display device, enabling the surrounding conditions of the vehicle and characteristics of nearby vehicles to be recognized.

The fourth, fifth, eighth, and ninth aspects of the disclosure, for example, implement automated driving or generate a route based on the traffic information, enabling automated driving that reflects the position of the vehicle and vehicle characteristics to be implemented.

BRIEF DESCRIPTION OF THE DRAWINGS

The advantages of the disclosure will become apparent in the following description taken in conjunction with the following drawings.

FIG. 14 is a diagram illustrating a state in which an environment recognition section recognizes other vehicles traveling nearby a vehicle.

FIG. 15 is a diagram illustrating an example of surroundings shared information transmitted to a server device by a vehicle.

FIG. 16A is a diagram illustrating an example of surroundings shared information and traffic information stored in a database of a server device.

FIG. 16B is a diagram illustrating an example of surroundings shared information and traffic information stored in a database of a server device.

DETAILED DESCRIPTION

Explanation follows regarding an embodiment of a vehicle control system, a traffic information sharing system, a vehicle control method, and a vehicle control program of the present disclosure, with reference to the drawings.

Figure 1:
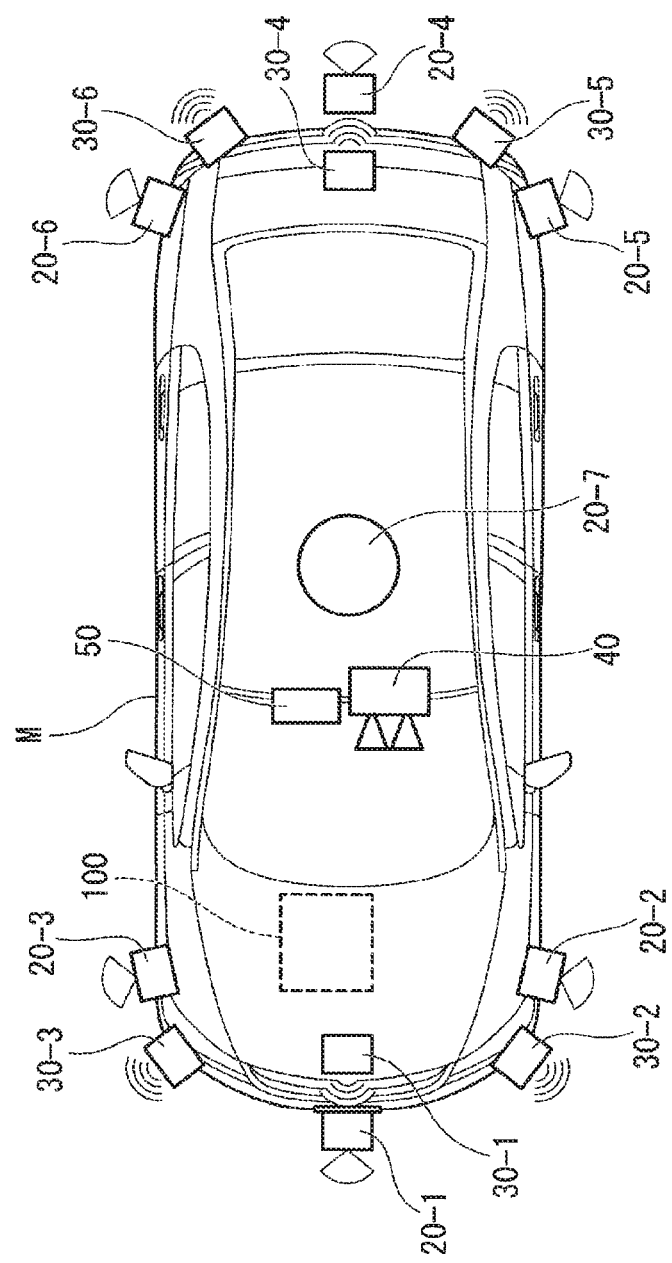
FIG. 1 is a diagram illustrating configuration elements of a vehicle of one embodiment.

FIG. 1 is a diagram illustrating configuration elements of a vehicle (referred to as the vehicle M hereafter) installed with a vehicle control system 100 of an embodiment. The vehicle installed with the vehicle control system 100 is, for example, a two-wheeled, three-wheeled, or four-wheeled automobile, and this encompasses automobiles having an internal combustion engine such as a diesel engine or gasoline engine as a power source, electric automobiles having an electric motor as a power source, and hybrid automobiles having both an internal combustion engine and an electric motor. Electric automobiles are, for example, driven using electric power discharged from a battery such as a secondary cell, a hydrogen fuel cell, a metal fuel cell, or an alcohol fuel cell.

As illustrated in FIG. 1, sensors such as finders 20-1 to 20-7, radars 30-1 to 30-6, and a camera 40; a navigation device 50; and the vehicle control system 100 are installed to the vehicle M.

The finders 20-1 to 20-7 are, for example, LIDARs (Light Detection and Ranging, or Laser Imaging Detection and Ranging) that measure the scattering of emitted light and measure the distance to a target. For example, the finder 20-1 is attached to a front grille or the like, and the finder 20-2 and the finder 20-3 are attached to a side face of a vehicle body, a door mirror, a front headlamp interior, the vicinity of a side lamp, or the like. The finder 20-4 is attached to a trunk lid or the like, the finder 20-5 and the finder 20-6 are attached to a side face of the vehicle body, a tail light interior, or the like. The finders 20-1 to 20-6 described above have detection regions of, for example, approximately 150° in a horizontal direction. The finder 20-7 is attached to a roof or the like. The finder 20-7 has a detection region of, for example, 360° in the horizontal direction.

The radar 30-1 and the radar 30-4 are, for example, long-range millimeter wave radars having a wider detection region in a depth direction than the other radars. The radars 30-2, 30-3, 30-5, 30-6 are intermediate-range millimeter wave radars having a narrower detection region in the depth direction than the radars 30-1 and 30-4.

Hereafter, the finders 20-1 to 20-7 are simply referred to as "finders 20" in cases in which no particular distinction is made, and the radars 30-1 to 30-6 are simply referred to as "radars 30" in cases in which no particular distinction is made. The radars 30, for example, detect objects using a frequency modulated continuous wave (FM-CW) method.

The camera 40 is, for example, a digital camera that employs a solid state imaging element such as a charge coupled device (CCD) or a complementary metal oxide semiconductor (CMOS) element. The camera 40 is attached to a front windshield upper portion, a back face of a rear-view mirror, or the like. The camera 40, for example, periodically and repeatedly images ahead of the vehicle M. The camera 40 may be a stereo camera that includes plural cameras.

Note that the configuration illustrated in FIG. 1 is merely an example; a portion of the configuration may be omitted, and other configuration may be further added.

Figure 2:
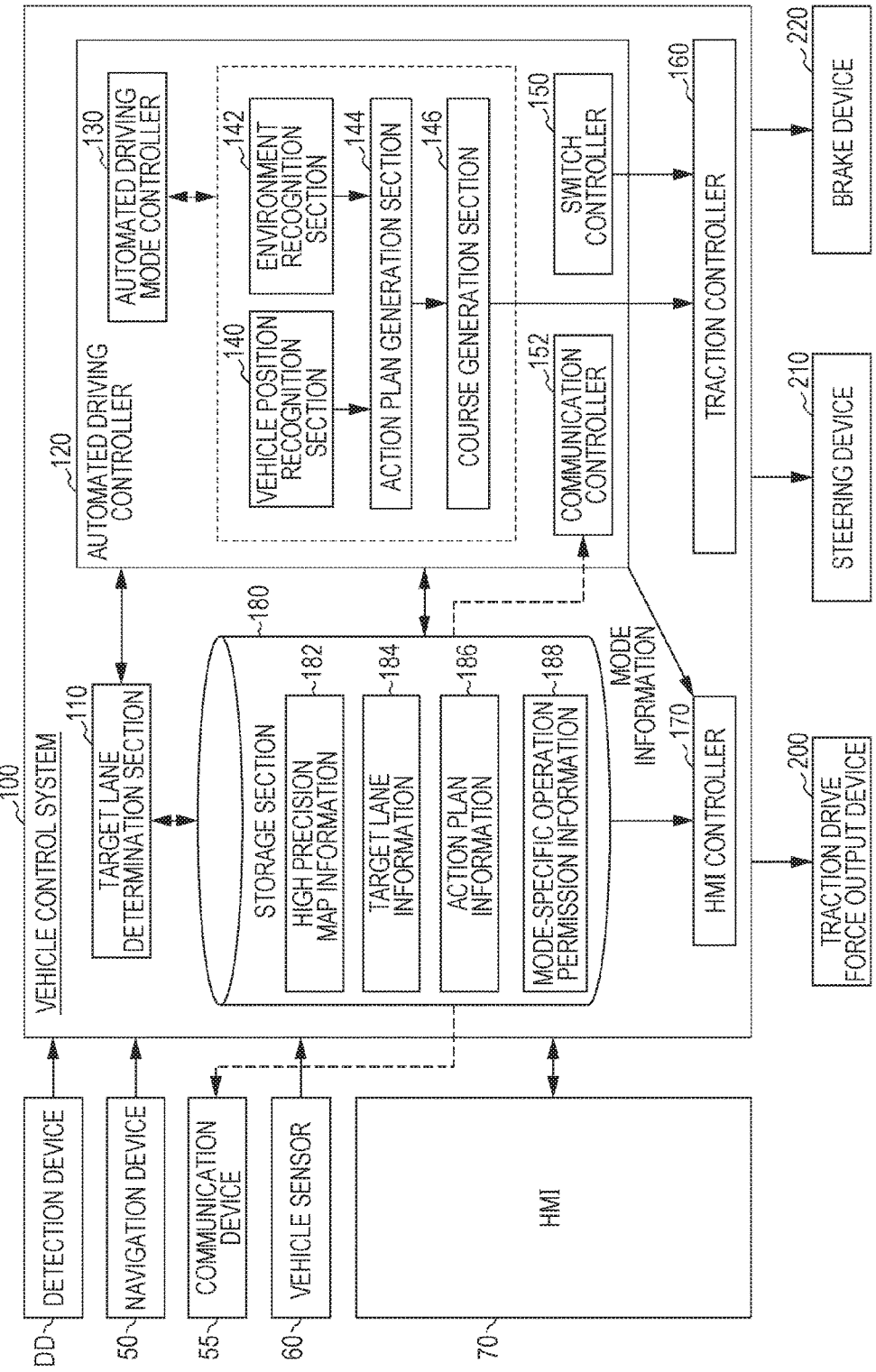
FIG. 2 is a functional configuration diagram focusing on a vehicle control system.

FIG. 2 is a functional configuration diagram focusing on the vehicle control system 100. Detection devices DD that include the finders 20, the radars 30, the camera 40, and the like; the navigation device 50; a communication device 55; vehicle sensors 60; a human machine interface (HMI) 70; the vehicle control system 100; a traction drive force output device 200; a steering device 210; and a brake device 220 are installed in the vehicle M. These devices and apparatuses are connected to one another by a multiplex communication line such as a controller area network (CAN) communication line, or by a wireless communication network, a serial communication line, or the like. Note that the vehicle control system within the scope of the claims does not indicate only the "vehicle control system 100", and may include configuration other than that of the vehicle control system 100 (such as the detection devices DD, the navigation device 50, the communication device 55, and the HMI 70).

The navigation device 50 includes a global navigation satellite system (GNSS) receiver, map information (a navigation map), a touch panel display device that functions as a user interface, a speaker, a microphone, and the like. The navigation device 50 identifies the position of the vehicle M using the GNSS receiver and derives a route from this position to a destination designated by a user. The route derived by the navigation device 50 is provided to a target lane determination section 110 of the vehicle control system 100. The position of the vehicle M may be identified or complemented by an inertial navigation system (INS) employing output from the vehicle sensors 60. When the vehicle control system 100 is executing a manual driving mode, the navigation device 50 provides guidance along a route to the destination using audio and a navigation display. Note that configuration for identifying the position of the vehicle M may be provided independently from the navigation device 50. Moreover, the navigation device 50 may, for example, be implemented by functionality of a terminal device such as a smartphone or a tablet terminal possessed by the user. In such cases, information is exchanged between the terminal device and the vehicle control system 100 using wireless or wired communication.

The communication device 55 performs wireless communication using, for example, a cellular network, a Wi-Fi network, Bluetooth (registered trademark), or dedicated short range communication (DSRC).

The vehicle sensors 60 include, for example, a vehicle speed sensor that detects vehicle speed, an acceleration sensor that detects acceleration, a yaw rate sensor that detects angular velocity about a vertical axis, and a directional sensor that detects the heading of the vehicle M.

Figure 3:
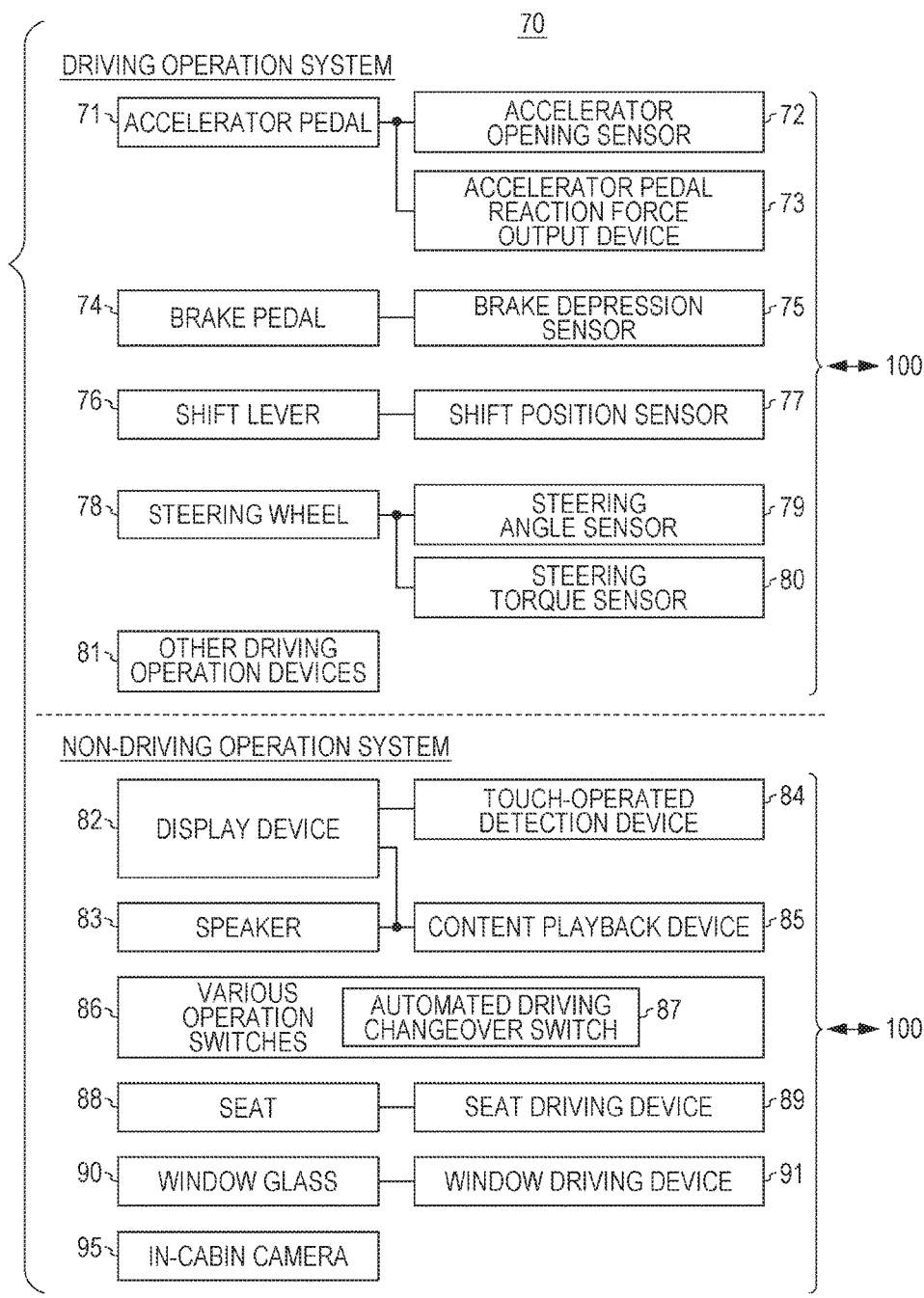
FIG. 3 is a configuration diagram of an HMI.

FIG. 3 is a configuration diagram of the HMI 70. The HMI 70 is provided with, for example, driving operation system configuration and non-driving operation system configuration. There is no clear boundary between the two, and driving operation system configuration may provide non-driving operation system functionality (or vise-versa).

As configuration of the driving operation system, the HMI 70 includes, for example, an accelerator pedal 71, an accelerator opening sensor 72 and an accelerator pedal reaction force output device 73, a brake pedal 74 and a brake depression sensor (or a master pressure sensor or the like) 75, a shift lever 76 and a shift position sensor 77, a steering wheel 78, a steering angle sensor 79 and a steering torque sensor 80, and other driving operation devices 81.

The accelerator pedal 71 is an operation element for receiving acceleration instructions from a vehicle occupant (or deceleration instructions due to return-operation). The accelerator opening sensor 72 detects a depression amount of the accelerator pedal 71, and outputs an accelerator opening signal indicating the depression amount to the vehicle control system 100. Note that output may be made directly to the traction drive force output device 200, the steering device 210, or the brake device 220 instead of outputting to the vehicle control system 100. Similar applies for other configuration of the driving operation system explained below. The accelerator pedal reaction force output device 73, for example, outputs force (an operation reaction force) in the opposite direction to the operation direction of the accelerator pedal 71, according to instructions from the vehicle control system 100.

The brake pedal 74 is an operation element for receiving deceleration instructions from the vehicle occupant. The brake depression sensor 75 detects a depression amount of (alternatively, the pressing force on) the brake pedal 74 and outputs a brake signal indicating the detection result to the vehicle control system 100.

The shift lever 76 is an operation element for receiving shift level change instructions from the vehicle occupant. The shift position sensor 77 detects the shift level instructed by the vehicle occupant and outputs a shift position signal indicating the detection result to the vehicle control system 100.

The steering wheel 78 is an operation element for receiving turning instructions from the vehicle occupant. The steering angle sensor 79 detects the steering angle of the steering wheel 78 and outputs a steering angle signal indicating the detection result to the vehicle control system 100. The steering torque sensor 80 detects the torque placed on the steering wheel 78 and outputs a steering torque signal indicating the detection result to the vehicle control system 100.

The other driving operation devices 81 are, for example, a joystick, a button, a dial switch, a graphical user interface (GUI) switch, and the like. The other driving operation devices 81 receive acceleration instructions, deceleration instructions, turning instructions, and the like and output the instructions to the vehicle control system 100.

As configuration of the non-driving operation system, the HMI 70 includes, for example, a display device 82, a speaker 83, a touch-operated detection device 84 and a content playback device 85, various operation switches 86, a seat 88 and a seat driving device 89, window glass 90 and a window driving device 91, and an in-cabin camera 95.

The display device 82 is, for example, a liquid crystal display (LCD), an organic electroluminescent (EL) display device, or the like attached to a respective section of an instrument panel, a freely selected location facing the front passenger seat or rear seat, or the like. Moreover, the display device 82 may be a head-up display (HUD) that projects an image onto the front windshield or another window. The speaker 83 outputs audio. In cases in which the display device 82 is a touch panel, the touch-operated detection device 84 detects a contact position (touch position) on a display screen of the display device 82, and outputs the contact position to the vehicle control system 100. Note that the touch-operated detection device 84 may be omitted in cases in which the display device 82 is not a touch panel.

The content playback device 85 includes, for example, a digital versatile disc (DVD) playback device, a compact disc (CD) playback device, a television receiver, various guidance image generation devices, and the like. Some or all out of the display device 82, the speaker 83, the touch-operated detection device 84, and the content playback device 85 may be configured so as to be shared with the navigation device 50.

The various operation switches 86 are disposed at freely selected locations inside the vehicle cabin. The various operation switches 86 include an automated driving changeover switch 87 for instructing automated driving to start (or to start in the future) or stop. The automated driving changeover switch 87 may be a graphical user interface (GUI) switch or a mechanical switch. Moreover, the various operation switches 86 may include a switch for driving the seat driving device 89 or window driving device 91.

The seat 88 is a seat in which the vehicle occupant sits. The seat driving device 89 freely drives the reclining angle, front-rear direction position, yaw angle, and the like of the seat 88. The window glass 90 is, for example, provided to each door. The window driving device 91 drives opening and closing of the window glass 90.

The in-cabin camera 95 is a digital camera that employs a solid state imaging element such as a CCD or a CMOS element. The in-cabin camera 95 is attached to a position from which at least the head of the vehicle occupant performing driving operation can be imaged, such as the rear-view mirror, steering wheel boss section, or instrument panel. The in-cabin camera 95, for example, images the vehicle occupant periodically and repeatedly.

Prior to explaining the vehicle control system 100, explanation follows regarding the traction drive force output device 200, the steering device 210, and the brake device 220.

The traction drive force output device 200 outputs traction drive force (torque) for causing the vehicle to travel to drive wheels. In cases in which the vehicle M is an automobile that has an internal combustion engine as the power source, the traction drive force output device 200 includes, for example, an engine, a transmission, and an engine electronic control unit (ECU) that controls the engine. In cases in which the vehicle M is an electric automobile that has an electric motor as the power source, the traction drive force output device 200 includes, for example, a traction motor and a motor ECU that controls the traction motor. In cases in which the vehicle M is a hybrid automobile, the traction drive force output device 200 includes, for example, an engine, a transmission, and an engine ECU; and a traction motor and a motor ECU. In cases in which the traction drive force output device 200 includes only an engine, the engine ECU adjusts the engine throttle opening, the shift level, or the like, in accordance with information input from a traction controller 160, described later. In cases in which the traction drive force output device 200 includes only a traction motor, the motor ECU adjusts a duty ratio of a PWM signal applied to the traction motor, in accordance with information input from the traction controller 160. In cases in which the traction drive force output device 200 includes an engine and a traction motor, the engine ECU and the motor ECU cooperatively control traction drive force, in accordance with information input from the traction controller 160.

The steering device 210 includes, for example, a steering ECU and an electric motor. The electric motor, for example, exerts force in a rack-and-pinion mechanism to change the orientation of the steering wheel. The steering ECU drives the electric motor in accordance with information input from the vehicle control system 100, or input information regarding the steering angle or steering torque, and changes the orientation of the steering wheel.

The brake device 220 is, for example, an electric servo brake device including a brake caliper, a cylinder that transmits hydraulic pressure to the brake caliper, an electric motor that causes the cylinder to generate hydraulic pressure, and a brake controller. The brake controller of the electric servo brake device controls an electric motor in accordance with information input from the traction controller 160, such that braking torque is output to each wheel in accordance with the braking operation. The electric servo brake device may include a mechanism that transmits hydraulic pressure generated due to operation of the brake pedal to the cylinder via a master cylinder as a backup. Note that the brake device 220 is not limited to the electric servo brake device explained above and may be an electronically controlled hydraulic brake device. The electronically controlled hydraulic brake device controls an actuator in accordance with information input from the traction controller 160 and transmits hydraulic pressure of a master cylinder to the cylinder. The brake device 220 may also include a regenerative brake that uses a traction motor which might be included in the traction drive force output device 200.

Vehicle Control System

Explanation follows regarding the vehicle control system 100. The vehicle control system 100 is, for example, implemented by one or more processors, or by hardware having equivalent functionality. The vehicle control system 100 may be configured by a combination of a processor such as a CPU, a storage device, and an ECU (electronic control unit) in which a communication interface is connected by an internal bus, or a micro-processing unit (MPU) or the like.

Returning to FIG. 2, the vehicle control system 100 includes, for example, the target lane determination section 110, an automated driving controller 120, the traction controller 160, and the storage section 180. The automated driving controller 120 includes, for example, an automated driving mode controller 130, a vehicle position recognition section 140, an environment recognition section 142, an action plan generation section 144, a course generation section 146, a switch controller 150, a communication controller 152, the traction controller 160, and an HMI controller 170. Some or all out of the target lane determination section 110, the respective sections of the automated driving controller 120, the traction controller 160, and the HMI controller 170 are implemented by the processor executing a program (software). Moreover, of these, some or all may be implemented by hardware such as a large scale integration (LSI) or an application specific integrated circuit (ASIC), or may be implemented by a combination of software and hardware.

The storage section 180 stores information such as high precision map information 182, target lane information 184, action plan information 186, and mode-specific operation permission information 188. The storage section 180 is implemented by read only memory (ROM) or random access memory (RAM), a hard disk drive (HDD), flash memory, or the like. The program executed by the processor may be pre-stored in the storage section 180, or may be downloaded from an external device via an onboard internet setup or the like. Moreover, the program may be installed in the storage section 180 by loading a portable storage medium storing the program into a drive device, not illustrated in the drawings. Moreover, the vehicle control system 100 may be configured distributed across plural computer devices.

The target lane determination section 110 is, for example, implemented by an MPU. The target lane determination section 110 divides the route provided from the navigation device 50 into plural blocks (for example, divides the route every 100 m along the direction of progress of the vehicle), and references the high precision map information 182 to determine the target lane for each block. The target lane determination section 110, for example, determines which lane number from the left to travel in. In cases in which a junction point, a merge point, or the like is present in the route, the target lane determination section 110, for example, determines the target lanes so as to enable the vehicle M to travel along a sensible travel route for advancing beyond the junction. The target lanes determined by the target lane determination section 110 are stored in the storage section 180 as the target lane information 184.

The high precision map information 182 is map information with higher precision than the navigation map of the navigation device 50. The high precision map information 182 includes, for example, lane-center information, lane-boundary information, or the like. The high precision map information 182 may also include, for example, road information, traffic restriction information, address information (address, postal code), facilities information, phone number information, and the like. The road information includes information such as information indicating whether the type of road is an expressway, a toll road, a national highway, or a prefectural road; the number of lanes in the road; the width of each lane; the gradient of the road; the position of the road (three dimensional coordinates including a longitude, a latitude, and an altitude); the curvature of the lanes; the position of lane merge and junction points; and signage provided on the road. The traffic restriction information includes information regarding lane closures due to road work, traffic accidents, congestion, and the like.

The automated driving mode controller 130 determines the automated driving mode to be implemented by the automated driving controller 120. The automated driving mode in the present embodiment includes the following modes. Note that the following modes are merely examples, and the number of modes of the automated driving may be freely determined.

Mode A

Mode A is the mode in which the level of automated driving is highest. In cases in which Mode A is being implemented, all vehicle controls, such as complex merging control, are performed automatically, such that a vehicle occupant does not need to monitor the surroundings or state of the vehicle M.

Mode B

Mode B is the mode having the next highest level of automated driving after Mode A. Although in principle all vehicle control is performed automatically in cases in which Mode B is implemented, the driving operation of the vehicle M may be entrusted to the vehicle occupant depending on the situation. The vehicle occupant therefore needs to monitor the surroundings and state of the vehicle M.

Mode C

Mode C is the mode having the next highest level of automated driving after Mode B. In cases in which Mode C is implemented, the vehicle occupant needs to perform confirmation operations on the HMI 70 depending on the situation. In Mode C, for example, the vehicle occupant is notified of the timing for a lane change, and the lane change is made automatically in cases in which the vehicle occupant has performed an operation on the HMI 70 instructing the lane change. The vehicle occupant therefore needs to monitor the surroundings and state of the vehicle M.

The automated driving mode controller 130 determines the automated driving mode based on operation on the HMI 70 by the vehicle occupant, events determined by the action plan generation section 144, traveling states determined by the course generation section 146, and the like. The automated driving mode is notified to the HMI controller 170. Moreover, a limit that depends on the performance of the detection devices DD of the vehicle M or the like may be set on the automated driving mode. For example, configuration may be such that the Mode A is not implemented in cases in which the performance of the detection devices DD is low. Whichever the mode, switching to manual driving mode (override) is possible by operating the driving operation system configuration of the HMI 70.

The vehicle position recognition section 140 of the automated driving controller 120 recognizes the lane in which the vehicle M is traveling (the travel lane) and the position of the vehicle M relative to the travel lane, based on the high precision map information 182 stored in the storage section 180, and the information input from the finders 20, the radars 30, the camera 40, the navigation device 50, or the vehicle sensors 60.

The vehicle position recognition section 140, for example, recognizes the travel lane by comparing a pattern of road demarcation lines (for example, an array of solid lines and dashed lines) recognized in the high precision map information 182 against a road demarcation line pattern of the surroundings of the vehicle M recognized in the images imaged using the camera 40. In the recognition, the position of the vehicle M acquired from the navigation device 50 or the processing result by the INS may be taken into account.

Figure 4:
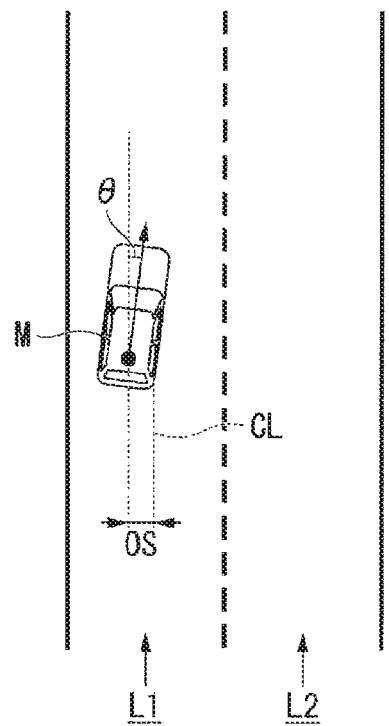
FIG. 4 is a diagram illustrating a state in which the position of a vehicle relative to a travel lane is recognized by a vehicle position recognition section.

FIG. 4 is a diagram illustrating a state in which the relative position of the vehicle M with respect to a travel lane L1 is recognized by the vehicle position recognition section 140. As the relative position of the vehicle M with respect to the travel lane L1, the vehicle position recognition section 140 recognizes an offset OS between a reference point (for example, the center of mass) of the vehicle M and a travel lane center CL, and an angle θ formed between the direction of progress of the vehicle M and a line aligned with the travel lane center CL. Note that, alternatively, the vehicle position recognition section 140 may recognize the position of the reference point of the vehicle M or the like with respect to either of the side end portions of the lane L1 itself as the relative position of the vehicle M with respect to the travel lane. The relative position of the vehicle M recognized by the vehicle position recognition section 140 is provided to the target lane determination section 110.

The environment recognition section 142 recognizes the position, speed, and acceleration states of nearby vehicles based on the information input from the finders 20, the radars 30, the camera 40, and the like. Nearby vehicles are, for example, vehicles that are traveling in the surroundings of the vehicle M and that are traveling in the same direction as the vehicle M. The positions of the nearby vehicles may be presented as representative points such as centers of mass or corners of other vehicles, or may be represented as regions expressed by the outlines of the other vehicles. The "state" of a nearby vehicle may include whether or not the nearby vehicle is accelerating or changing lanes (or whether or not the nearby vehicle is attempting to change lanes), as ascertained based on the information of the various apparatuses described above. The environment recognition section 142 may also recognize the position of a guard rail, a utility pole, a parked vehicle, a pedestrian, and other objects in addition to the nearby vehicles.

The action plan generation section 144 sets a starting point of automated driving and/or a destination of automated driving. The starting point of automated driving may be the current position of the vehicle M, or may be a point set by operation to instruct automated driving. The action plan generation section 144 generates an action plan in the segments between the starting point and the destination of automated driving. Note that there is no limitation thereto, and the action plan generation section 144 may generate an action plan for freely selected segments.

The action plan is, for example, composed of plural events to be sequentially executed. The events include, for example: a deceleration event that causes the vehicle M to decelerate, an acceleration event that causes the vehicle M to accelerate, a lane-keep event that causes the vehicle M to travel without departing from the travel lane, a lane-change event that causes the travel lane to change, an overtake event that causes the vehicle M to overtake the vehicle in front, a junction event that causes a lane change to the desired lane at a junction point or causes the vehicle M to travel so as not to depart from the current travel lane, a merge event that causes the vehicle M to accelerate or decelerate in a merging lane for merging with a main lane and changes the travel lane, and a handover event that causes a transition from the manual driving mode to the automated driving mode at a starting point of automated driving or causes a transition from the automated driving mode to the manual driving mode at a point where automated driving is expected to end. The action plan generation section 144 sets a lane-change event, a junction event, or a merge event at places where the target lane determined by the target lane determination section 110 switches. Information indicating the action plan generated by the action plan generation section 144 is stored in the storage section 180 as the action plan information 186.

Figure 5:
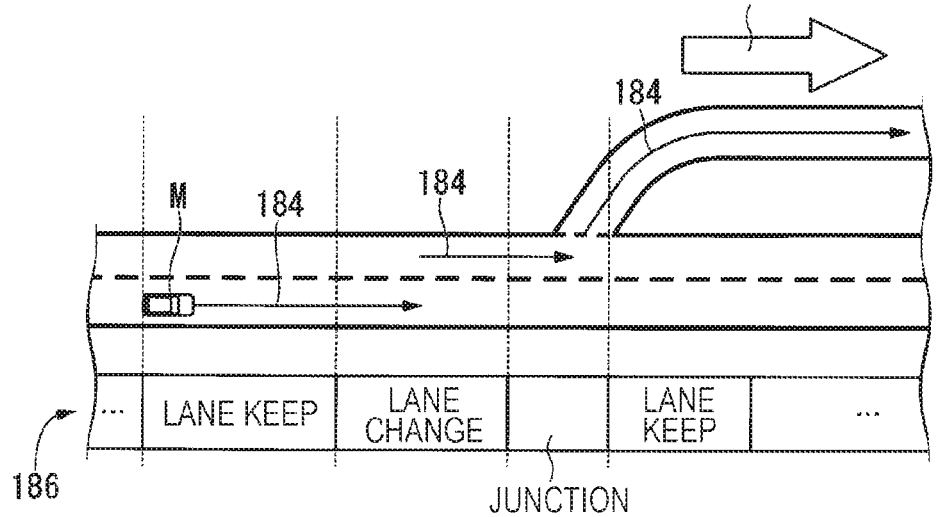
FIG. 5 is a diagram illustrating an example of action plans generated for given segments.

FIG. 5 is a diagram illustrating an example of the action plan generated for a given segment. As illustrated in this figure, the action plan generation section 144 generates the action plan needed for the vehicle M to travel in the target lane indicated by the target lane information 184. Note that the action plan generation section 144 may dynamically change the action plan irrespective of the target lane information 184, in accordance with changes to the conditions of the vehicle M. For example, in cases in which the speed of a nearby vehicle recognized by the environment recognition section 142 during vehicle travel exceeds a threshold value, or the movement direction of a nearby vehicle traveling in a lane adjacent to the vehicle-itself lane is toward the vehicle-itself lane direction, the action plan generation section 144 changes an event set in the driving segments that the vehicle M was expected to travel. For example, in cases in which events have been set such that a lane-change event is to be executed after a lane-keep event, when, during the lane-keep event, the recognition result of the environment recognition section 142 has determined that a vehicle is approaching from the rear in the lane change target lane at a speed at or above a threshold value, the action plan generation section 144 may change the event following the lane-keep event from a lane-change event to a deceleration event, a lane-keep event, or the like. As a result, the vehicle control system 100 can cause the vehicle M to autonomously travel safely even in cases in which a change occurs to the state of the environment.

Figure 6:
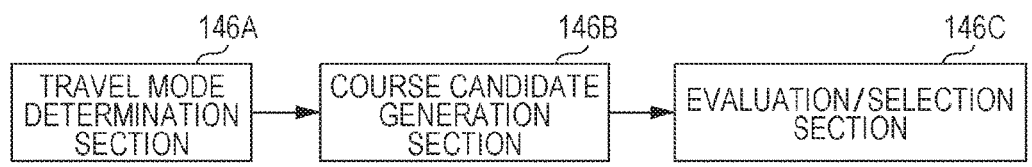
FIG. 6 is a diagram illustrating an example of a configuration of a course generation section.

FIG. 6 is a diagram illustrating an example of the configuration of the course generation section 146. The course generation section 146 includes, for example, a travel mode determination section 146A, a course candidate generation section 146B, and an evaluation/selection section 146C.

When implementing a lane-keep event, the travel mode determination section 146A, for example, determines a travel mode from out of constant speed travel, following-travel, low speed following-travel, decelerating travel, curve travel, obstacle avoidance travel, or the like. In such cases, the travel mode determination section 146A determines that the travel mode is constant speed travel when no other vehicles are present ahead of the vehicle M. The travel mode determination section 146A determines that the travel mode is following-travel in cases such as when a vehicle in front is to be followed. The travel mode determination section 146A determines that the travel mode is low speed following-travel in a congested situation or the like. The travel mode determination section 146A determines that the travel mode is decelerating travel in cases in which deceleration of a vehicle in front has been recognized by the environment recognition section 142, and in cases in which an event for, for example, stopping or parking is implemented. The travel mode determination section 146A determines that the travel mode is curve travel in cases in which the environment recognition section 142 has recognized that the vehicle M is approaching a curve in the road. The travel mode determination section 146A determines that the travel mode is obstacle avoidance travel in cases in which the environment recognition section 142 has recognized an obstacle in front of the vehicle M. Moreover, when carrying out lane-change events, overtake events, junction events, merge events, handover events, or the like, the travel mode determination section 146A determines the travel mode in accordance with each event.

Figure 7:
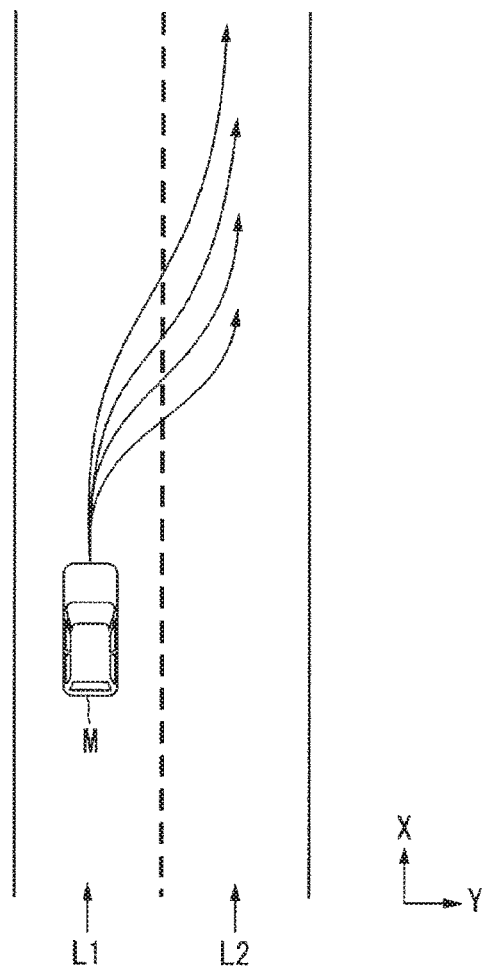
FIG. 7 is a diagram illustrating example candidates for a course generated by a course candidate generation section.

The course candidate generation section 146B generates candidates for a course based on the travel mode determined by the travel mode determination section 146A. FIG. 7 is a diagram illustrating example candidates for a course generated by the course candidate generation section 146B. FIG. 7 illustrates candidates for a course generated when the vehicle M changes lanes from a lane L1 to a lane L2.

Figure 8:
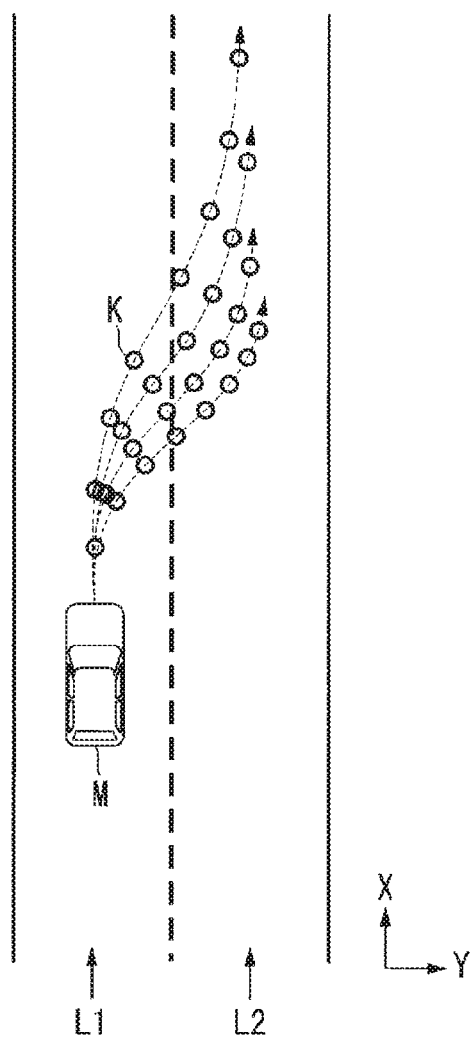
FIG. 8 is a diagram in which candidates for a course generated by a course candidate generation section are represented by course points.

Courses such as illustrated in FIG. 7, for example, are determined by the course candidate generation section 146B as collections of target positions (course points K) where the reference position (for example, the center of mass or rear wheel axle center) of the vehicle M is to arrive at predetermined times in the future. FIG. 8 is a diagram illustrating candidates for a course generated by the course candidate generation section 146B, represented by course points K. The wider the separation between course points K, the faster the speed of the vehicle M, and the narrower the separation between course points K, the slower the speed of the vehicle M. Accordingly, the course candidate generation section 146B gradually widens the separations between the course points K when acceleration is desired, and gradually narrows the separations between the course points when deceleration is desired.

Thus, the course candidate generation section 146B needs to apply a target speed to each course point K since the course points K include a speed component. The target speed is determined in accordance with the travel mode determined by the travel mode determination section 146A.

Figure 9:
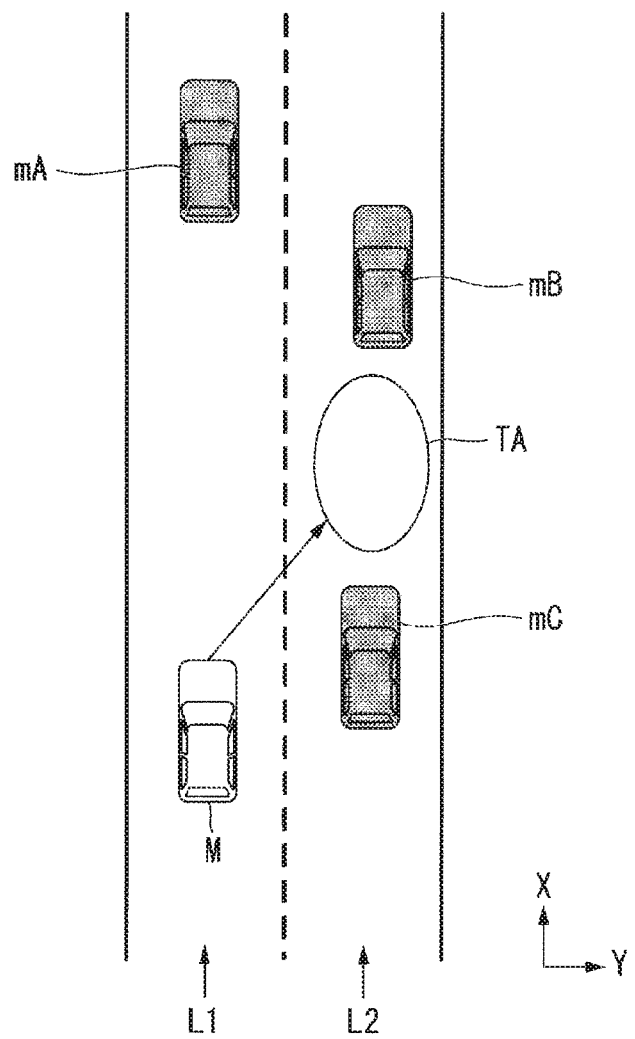
FIG. 9 is a diagram illustrating a lane change target position.

Explanation follows regarding a determination method for the target speed for performing a lane change (including at junctions). The course candidate generation section 146B first sets a lane change target position (or a merge target position). The lane change target position is set as a position relative to nearby vehicles, and determines "between which nearby vehicles to change lanes". The course candidate generation section 146B observes three nearby vehicles as references for the lane change target position, and determines a target speed for performing the lane change. FIG. 9 is a diagram illustrating a lane change target position TA. In this figure, L1 represents the lane of the vehicle, and L2 represents an adjacent lane. Here, a vehicle in front mA is defined as a nearby vehicle traveling directly in front of the vehicle M in the same lane as the vehicle M, a forward reference vehicle mB is defined as a nearby vehicle traveling directly in front of the lane change target position TA, and a rear reference vehicle mC is defined as a nearby vehicle traveling directly behind the lane change target position TA. The vehicle M needs to accelerate or decelerate to move to beside the lane change target position TA, but must avoid tailgating the vehicle in front mA at this time. The course candidate generation section 146B therefore predicts the future state of the three nearby vehicles and determines a target speed that will not interfere with any of the nearby vehicles.

Figures 10, 11:
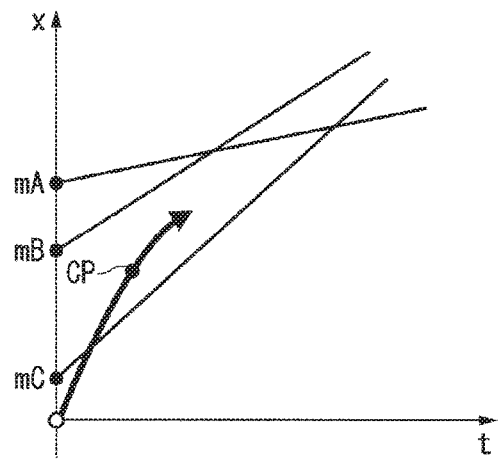
FIG. 10 is a diagram illustrating a speed generation model in a case in which the speeds of three nearby vehicles are assumed to be constant.
FIG. 11 is a table illustrating an example of mode-specific operation permission information.

FIG. 10 is a diagram illustrating a speed generation model when the speed of the three nearby vehicles is assumed to be constant. In this figure, the straight lines extending from mA, mB, and mC each represent a displacement in the direction of progress when the nearby vehicles are assumed to be traveling at respective constant speeds. At a point CP where the lane change finishes, the vehicle M must be between the forward reference vehicle mB and the rear reference vehicle mC, and up to that point must be behind the vehicle in front mA. Under such restrictions, the course candidate generation section 146B derives plural time series patterns of target speeds up to when the lane change finishes. Then, the time series patterns of target speeds are applied to a model such as a spline curve to derive plural candidates for the course as illustrated in FIG. 8. Note that the movement pattern of the three nearby vehicles is not limited to that of constant speeds such as illustrated in FIG. 10, and may be predicted under the assumption of constant acceleration or constant jerk.

The evaluation/selection section 146C, evaluates, for example, the candidates for the course generated by the course candidate generation section 146B from the two viewpoints of plan achievability and safety, and selects a course to be output to the traction controller 160. From the viewpoint of plan achievability, a course is evaluated highly in cases in which, for example, the course closely follows a previously generated plan (for example, an action plan) and the total length of the course is short. For example, in cases in which a lane change to the right is desired, a course that temporarily changes lanes to the left and then returns is given a low evaluation. From the viewpoint of safety, for example, the further the distance between the vehicle M and an object (such as a nearby vehicle) and the smaller the amount of change in acceleration/deceleration, steering angle, or the like at each course point, the higher the evaluation.

The switch controller 150 switches between the automated driving mode and the manual driving mode based on a signal input from the automated driving changeover switch 87. The switch controller 150 also switches from the automated driving mode to the manual driving mode based on an operation on the configuration of the driving operation system of the HMI 70 instructing acceleration, deceleration, or steering. For example, the switch controller 150 switches from the automated driving mode to the manual driving mode (overrides) when a state in which an operation amount indicated by the signal input from the configuration of the driving operation system of the HMI 70 exceeds a threshold value has continued for a reference duration or longer. Note that after switching to the manual driving mode due to override, the switch controller 150 may return to the automated driving mode in cases in which operation on the configuration of the driving operation system of the HMI 70 has not been detected for a predetermined amount of time.

The communication controller 152 uses the communication device 55 to transmit information relating to the surroundings of the vehicle M recognized by the environment recognition section 142, and information indicating an automated driving execution status, to other vehicles, these being other devices, or to a server device 260, described later.

The traction controller 160 controls the traction drive force output device 200, the steering device 210, and the brake device 220 such that the vehicle M passes through the course generated by the course candidate generation section 146B at expected timings.

When notified of information relating to the automated driving mode by the automated driving controller 120, the HMI controller 170 references the mode-specific operation permission information 188, and controls the HMI 70 according to the classification of the automated driving mode.

FIG. 11 is a table illustrating an example of the mode-specific operation permission information 188. The mode-specific operation permission information 188 illustrated in FIG. 11 includes "manual driving mode" and "automated driving mode" as driving mode items. The mode-specific operation permission information 188 includes "Mode A", "Mode B", "Mode C", and the like described above under "automated driving mode". The mode-specific operation permission information 188 also includes "navigation operation", which is an operation on the navigation device 50, "content playback operation", which is an operation on the content playback device 85, "instrument panel operation", which is an operation on the display device 82, and the like, as items of the non-driving operation system. In the example of the mode-specific operation permission information 188 illustrated in FIG. 11, permissions are set for operations by the vehicle occupant on the non-driving operation system for each of the driving modes described above; however, the relevant interface devices are not limited thereto.

The HMI controller 170 determines the devices for which usage is permitted (part or all of the navigation device 50 and the HMI 70) and the devices for which usage is not permitted by referencing the mode-specific operation permission information 188 based on the mode information acquired from the automated driving controller 120. The HMI controller 170 also controls permissions for receiving operations on the HMI 70 or the navigation device 50 of the non-driving operation system from a vehicle occupant based on the determination result.

For example, when the driving mode executed by the vehicle control system 100 is the manual driving mode, a vehicle occupant operates the driving operation system of the HMI 70 (for example, the accelerator pedal 71, the brake pedal 74, the shift lever 76, the steering wheel 78, and the like). When the driving mode executed by the vehicle control system 100 is an automated driving mode such as Mode B or Mode C, the vehicle occupant has a responsibility to monitor the surroundings of the vehicle M. In such a case, in order to prevent activities (driver distractions) other than driving (for example, operating the HMI 70) from distracting the attention of the vehicle occupant, the HMI controller 170 performs control such that part or all of the non-driving operation system of the HMI 70 does not receive operations. At such times, in order to promote monitoring of the surroundings of the vehicle M, the HMI controller 170 may cause the presence of vehicles nearby the vehicle M that have been recognized by the environment recognition section 142 and the state of these nearby vehicles to be displayed on the display device 82 using images or the like, and the HMI controller 170 may ensure confirmation operations are received by the HMI 70 in accordance with the situation the vehicle M is traveling in.

When the driving mode is Mode A of the automated driving modes, the HMI controller 170 relaxes driver distraction restrictions and performs control such that non-driving operation system that was not receiving operations can receive operations from the vehicle occupant. For example, the HMI controller 170 displays an image on the display device 82, outputs audio through the speaker 83, or plays back content from a DVD or the like on the content playback device 85. Note that in addition to content stored on a DVD or the like, the content played back by the content playback device 85 may include, for example, various content related to leisure and entertainment, such as television programming. The "content playback operation" illustrated in FIG. 11 may also mean a content operation related to such leisure and entertainment.

Traffic Information Sharing System

Figure 12:
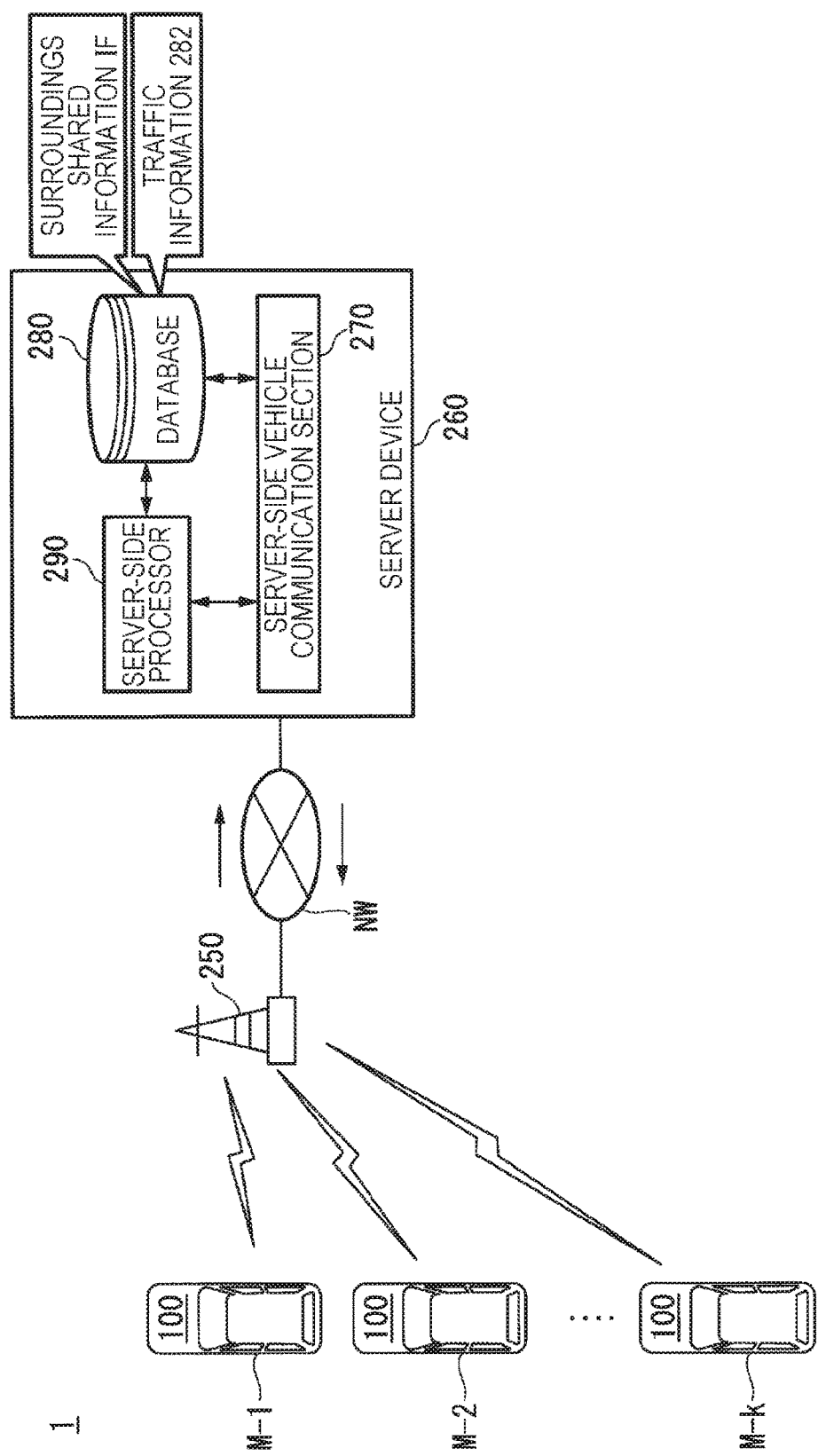
FIG. 12 is a diagram illustrating an example of configuration of a traffic information sharing system including vehicle control systems.

FIG. 12 is a diagram illustrating an example of configuration of the traffic information sharing system 1 including the vehicle control system 100. The traffic information sharing system 1 includes a base station device 250, the server device 260, and plural vehicles M-1 to M-k (k being a freely selected natural number) each installed with the vehicle control system 100. For example, the vehicle M is included among the vehicles M-1 to M-k.

The base station device 250 uses, for example, a mobile telephone network, a Wi-Fi network, or the like to communicate wirelessly between the respective vehicles (M-1 to M-k). Communication between the base station device 250 and the server device 260 is performed over a network NW. The network NW is, for example, a Wide Area Network (WAN) or a Local Area Network (LAN). The respective vehicles communicate with the server device 260 via the base station device 250.

The server device 260 includes a server-side vehicle communication section 270, a database 280, and a server-side processor 290. The server-side vehicle communication section 270 acquires information transmitted by the respective vehicles via the base station device 250. The server-side vehicle communication section 270 also transmits information retained in the server device 260 to a specific vehicle. The server-side vehicle communication section 270 may also acquire information relating to road conditions, weather, and the like detected by sensors installed along the road.

The database 280 is stored with, for example, information acquired from the respective vehicles, and information relating to road conditions, weather, and the like. The server-side processor 290 processes (manipulates) information acquired from the respective vehicles, or information stored in the database 280. The processing of the server-side processor 290 will be described in detail later.

Note that the server-side processor 290 may function as part of a navigation system. In such cases, the server-side processor 290 derives, for example, a route and required time to a set destination based on the information acquired from the respective vehicles by the server-side vehicle communication section 270, or on information stored in the database 280. The server-side processor 290 may, for example, analyze the information stored in the database 280, the information acquired by the server-side vehicle communication section 270, and the like to derive the route that is able to reach the destination in the fastest time for each vehicle, and transmit the derived routes to the respective vehicles.

Figure 13:
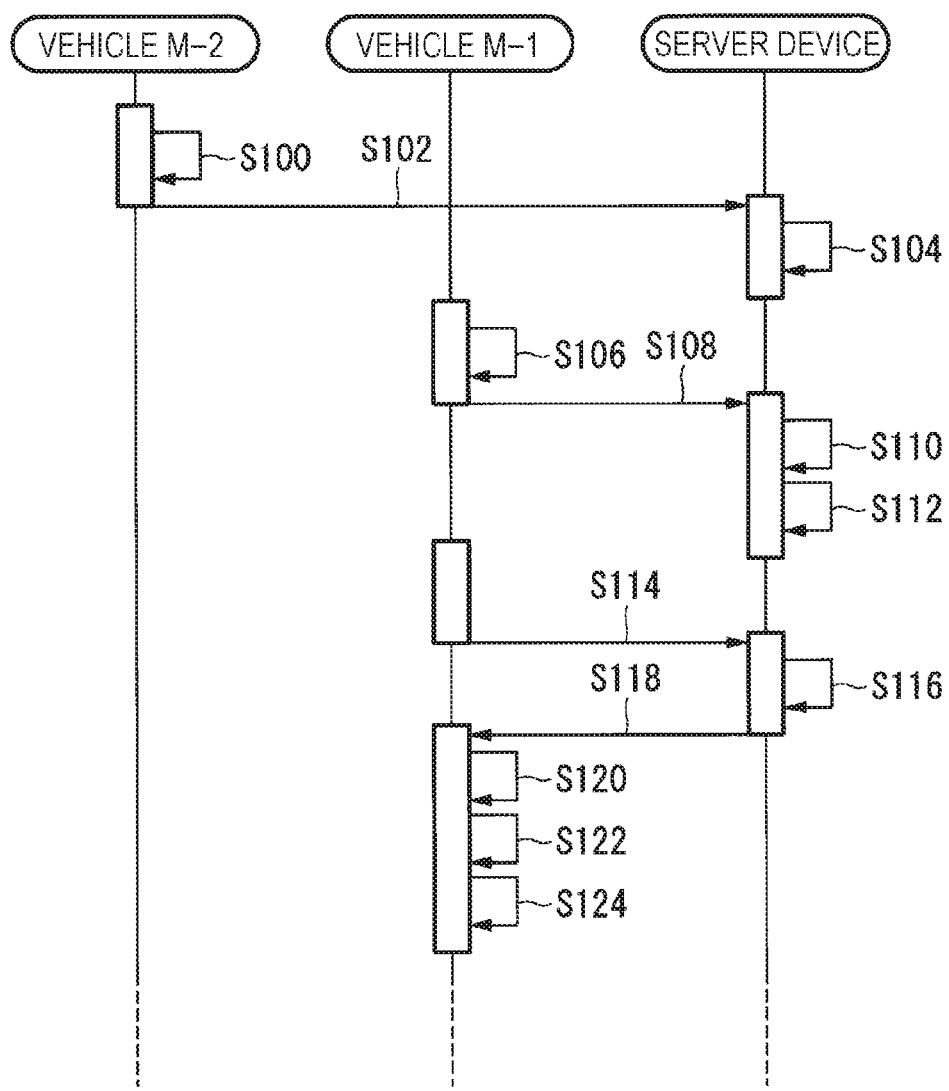
FIG. 13 is a sequence diagram illustrating a flow of processing executed between vehicles and a server device.

FIG. 13 is a sequence diagram illustrating a flow of processing executed between the vehicles and the server device 260. Explanation will focus on the vehicle M-1 and the vehicle M-2 as an example, and the processing executed between the vehicles of interest (M-1 and M-2) and the server device 260 will be explained.

First, the vehicle M-2 acquires information relating to the vehicle surroundings (step S100), and transmits the acquired vehicle surroundings information, position information for the vehicle M-2, and information indicating the execution status of automated driving, to the server device 260 (step S102). Next, the server device 260 acquires the information transmitted from the vehicle M-2, and stores the information in the database 280 (step S104).

Similarly, the vehicle M-1 acquires information relating to the vehicle surroundings (step S106), and transmits the acquired vehicle surroundings information, position information for the vehicle M-1, and information indicating the execution status of automated driving, to the server device 260 (step S108). A timing at which the vehicle M-1 acquires the vehicle surroundings information and a timing for transmitting the acquired vehicle surroundings information and the like may be any appropriate timings.

The environment recognition section 142 of the vehicle M-1 recognizes vehicles and objects present in the surroundings of the vehicle M-1. FIG. 14 is a diagram illustrating a state in which the environment recognition section 142 recognizes the vehicle M-2 and the vehicle M-3 traveling nearby the vehicle M-1. The environment recognition section 142 identifies the positions of the vehicle M-2 and the vehicle M-3 with respect to the vehicle M-1 based on the recognition results. The vehicle M-1 transmits the position information of the other vehicles identified (M-2 and M-3), the position information of the vehicle M-1, and the information indicating the execution status of automated driving to the server device 260.

FIG. 15 is a diagram illustrating an example of surroundings shared information IF transmitted to the server device 260 by the vehicle M-1. The surroundings shared information IF includes identifying information for the vehicle from which the information originated, position information of the vehicle, and information indicating the execution status of automated driving of the vehicle. The information indicating the execution status of automated driving includes some or all out of: information indicating whether or not an automated driving mode is being executed, information indicating the automated driving mode being executed, information indicating a scheduled timing for switching from a manual driving mode to the automated driving mode, information indicating a scheduled timing for switching from the automated driving mode to the manual driving mode, and the like. The surroundings shared information IF also includes identifying information for vehicles, objects, or the like in the surroundings of the vehicle, and position information for the vehicles, objects, or the like. The position information of the vehicles, objects, or the like is, for example, information indicating the positions thereof relative to the position of the vehicle. Moreover, some information out of the information included in the surroundings shared information IF may be omitted.

Note that the position information and the information indicating the automated driving execution status may be transmitted to the server device 260 at different timings to each other. In such cases, for example, identifying information indicating the vehicle from which the information originated is transmitted associated with each piece of information.

Next, the server device 260 acquires information transmitted from the vehicle M-1, and stores the information in the database 280 (step S110). Next, the server device 260 generates traffic information based on the information stored in the database 280 (step S112). The traffic information generation executed by the server device 260 may be executed at any appropriate timing.

FIG. 16A and FIG. 16B are diagrams illustrating an example of the surroundings shared information IF and traffic information 282 stored in the database 280 of the server device 260. FIG. 16A is a diagram illustrating an example of a list of the surroundings shared information IF prior to manipulation. FIG. 16B is a diagram illustrating an example of the traffic information 282, this being the result of manipulation of the surroundings shared information. The server-side processor 290 generates traffic information 282 as illustrated in FIG. 16B for a particular area by manipulating the surroundings shared information IF illustrated in FIG. 16A.

The traffic information 282 is information that has been collated under predetermined categories from the information included in the surroundings shared information IF. The traffic information 282 is, for example, information in which an amount of vehicles and their vehicle automated driving execution statuses (for example the proportion of vehicles in which automated driving is being implemented), as well as identifying information and the like for vehicles and objects, are associated with respective information relating to roads on which the vehicles and objects are present, and with respective directions of travel of the vehicles and objects. The information relating to roads includes road links corresponding to the road on which a vehicle is present, and information for the lane in which the vehicle is present. The lane information is an identifier applied to the lane. For example, identifiers such as "01, . . . , N" (N being any natural number) are applied to the plural lanes present on a road link, in sequence starting from the left-hand lane. Note that the "traffic information 282, this being the result of manipulation" may include not only collated results of the surroundings shared information IF, as illustrated in FIG. 16B, but may also information in which the surroundings shared information IF has simply been strung together. Moreover, high precision map information including the information relating to roads is stored in a storage section (not illustrated in the drawings) of the server device 260.

Explanation now returns to FIG. 13. When a request signal is transmitted by the vehicle M-1 (step S114), the server device 260 acquires the request signal and extracts information in response to the acquired request signal (step S116), and transmits the extracted information to the vehicle M-1 (step S118). The request signal includes, for example, identifying information of the vehicle M-1, or identifying information of the communication device 55 of the vehicle M-1, as well as position information for the vehicle M-1. When the server-side processor 290 acquires the request signal, the server-side processor 290 for example extracts the traffic information 282 for the area corresponding to the position information contained in the request signal, and transmits the extracted traffic information 282 to the vehicle M-1. The server-side processor 290, for example, isolates information for an area centered on the position of the vehicle from which the request originated from the traffic information 282, and sends the isolated information to the vehicle from which the request originated. Note that a timing at which the request signal is transmitted by the vehicle M-1 may be any appropriate timing.

Figure 17:
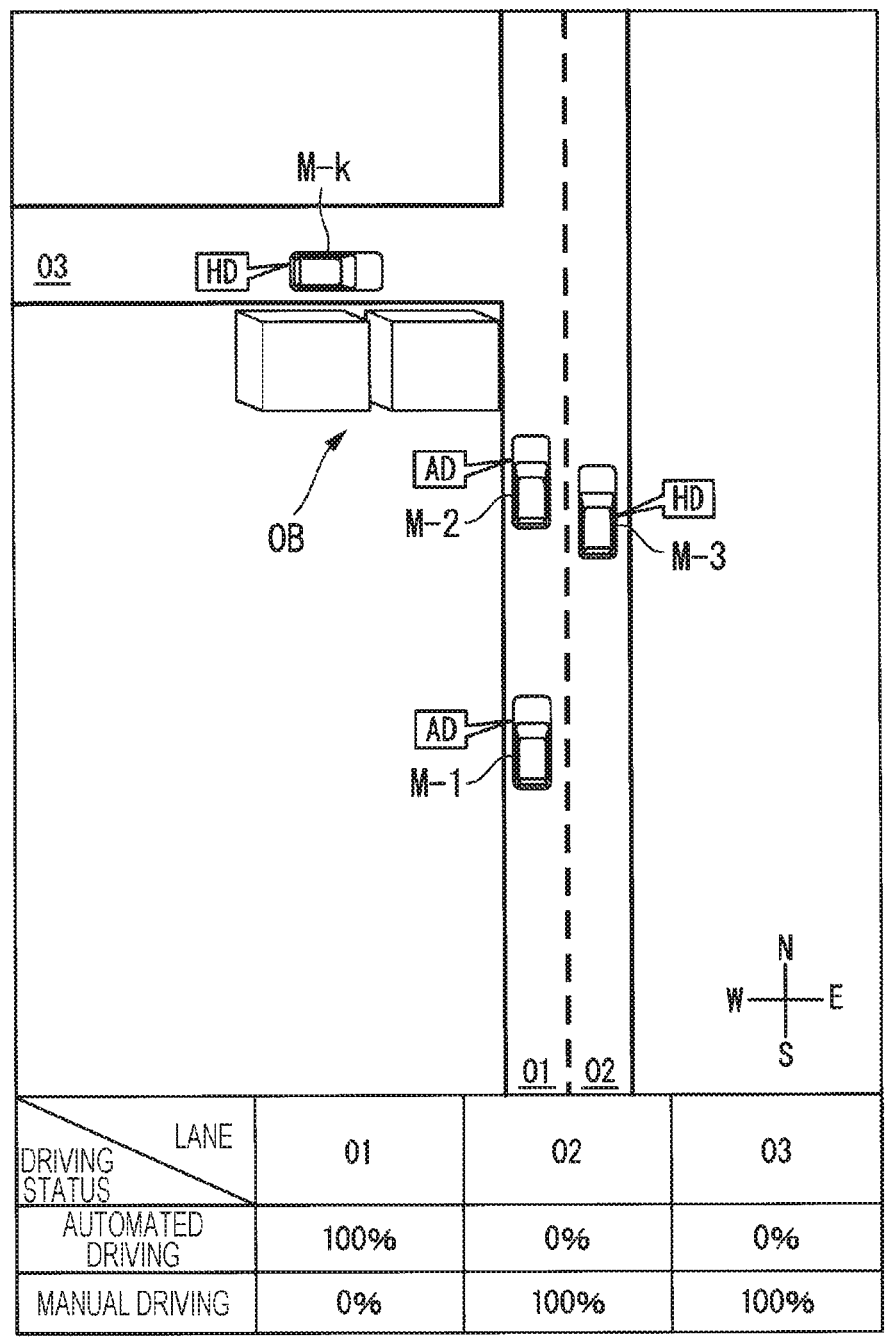
FIG. 17 is a diagram illustrating an example of an image displayed on a display device based on traffic information.

Next, when the vehicle M-1 has acquired the traffic information 282 transmitted from the server device 260, the HMI controller 170 displays an image corresponding to the traffic information 282 on the display device 82 of the vehicle M-1 (step S120). FIG. 17 is a diagram illustrating an example of an image corresponding to the traffic information 282 displayed on the display device 82. For example, the display device 82 displays road information for the surroundings of the vehicle M-1, the positions of vehicles present nearby the vehicle M-1, the automated driving execution status of vehicles present nearby the vehicle M-1, and an automated driving execution rate for each lane, associated with one another.

For example, suppose that a blind spot is present at the far side of a building OB present in the direction of travel of the vehicle M-1, and that the vehicle M-k is present in the blind spot. A vehicle occupant is unable to see the vehicle M-k. However, since the display device 82 displays an image corresponding to the traffic information 282, it is possible to recognize the presence of the vehicle M-k that cannot be seen from the inside of the vehicle M-1. This thereby enables greater convenience for the vehicle occupant as a result.

Figure 18:
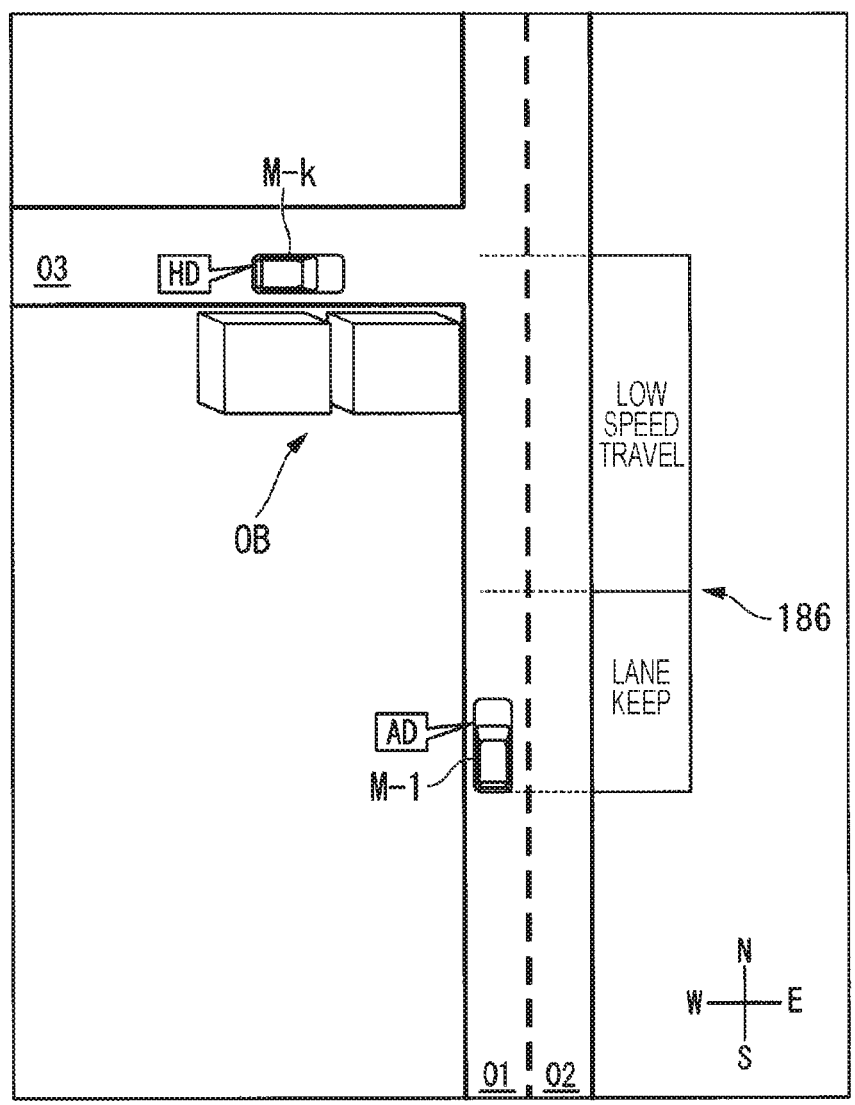
FIG. 18 is a diagram illustrating an example of automated driving control being changed based on traffic information.

Next, the automated driving controller 120 changes automated driving control based on the acquired traffic information 282 (step S122). FIG. 18 is a diagram illustrating an example of a change in the automated driving control based on the traffic information 282. The vehicle M-2 and the vehicle M-3 are omitted from illustration in the example of FIG. 18. Suppose that before acquiring the traffic information 282, the automated driving controller 120 had generated a plan to continue lane keep. After acquiring the traffic information 282, the automated driving controller 120 for example predicts that the vehicle M-k present in the blind spot as described above will drive out into the lane in which the vehicle M-1 is traveling. Based on this prediction, the automated driving controller 120 then changes the action plan in the vicinity of an intersection point where the lane in which the vehicle M-k is traveling intersects with the lane in which the vehicle M-1 is traveling, to a plan for low speed travel. The vehicle control system 100 is thus capable of generating an automated driving plan reflecting the surrounding conditions of the vehicle M-1.

The automated driving controller 120 may change the action plan from lane keep to a plan to change lanes from lane 01 to lane 02, instead of, or in addition to, low speed travel. Moreover, the automated driving controller 120 may change the action plan from lane keep to a plan to change lanes from lane 01 to lane 02 if the lane 01 is busy.

Note that in the example described above, explanation has been given in which the automated driving controller 120 changes the action plan. Alternatively, or additionally, the automated driving controller 120 may change a target lane to a different lane to a preset target lane. For example, in the example illustrated in FIG. 18, the target lane may be changed from the lane in which the vehicle M-1 is traveling to the adjacent lane (lane 02).

Figure 19:
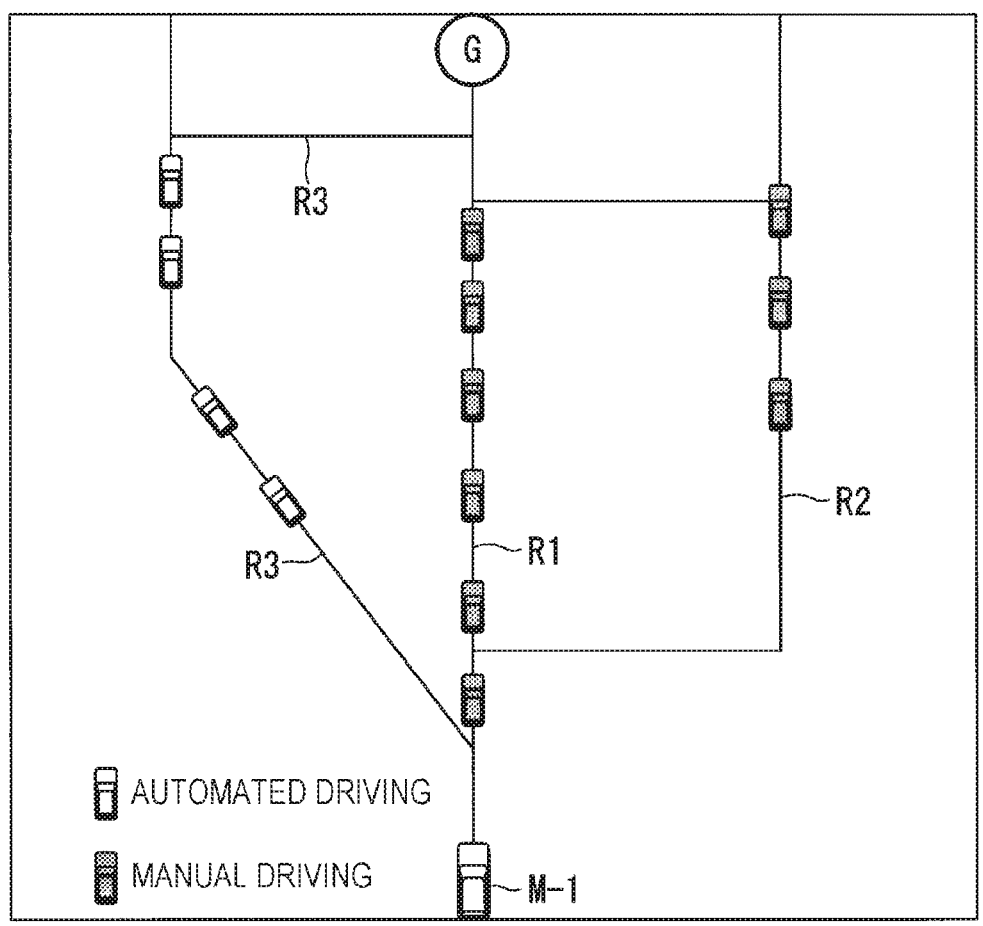
FIG. 19 is a diagram illustrating another example of an image displayed on a display device based on traffic information.

Next, the navigation device 50 of the vehicle M-1 derives a route to the set destination based on the acquired traffic information 282 (step S124). FIG. 19 is a diagram illustrating another example of an image corresponding to the traffic information 282 displayed on the display device 82. FIG. 19 illustrates an example in which traffic information 282 for plural adjacent blocks is linked together and displayed on the display device 82. In FIG. 19, the white vehicles represent vehicles in which automated driving is being implemented, and the shaded vehicles represent vehicles in which automated driving is not being implemented. In this manner, display distinguishes between vehicles in which automated driving is being implemented, and vehicles in which automated driving is not being implemented, enabling the vehicle occupant to recognize vehicle characteristics as well as the degree of road congestion. Note that the example illustrated in FIG. 19 shows an example in which the automated driving execution status is displayed for each vehicle. However, the automated driving execution rate for each road link may be displayed.

Moreover, the navigation device 50 may derive a degree of congestion for roads based on the traffic information taking into account the vehicle characteristics, and then derive a route to the destination (G in FIG. 19) based on the derived degree of congestion. The navigation device 50 makes the assumption that, for example, the vehicles in which automated driving is being implemented are being controlled so as to behave more efficiently than the vehicles in which automated driving is not being implemented. For example, when deriving the degree of congestion, the navigation device 50 employs a predetermined indicator value with respect to the vehicles in which automated driving is not being implemented, and employs a smaller indicator value than the predetermined indicator value for the vehicles in which automated driving is being implemented. For example, in the example illustrated in FIG. 19, the navigation device 50 multiplies the vehicles in which automated driving is not being implemented by 2, and multiplies the vehicles in which automated driving is being implemented by 1. In such cases, the degree of congestion for a route R1 for the vehicle M-1 to reach the destination G is 12 (2×6 vehicles), is 6 (2×3 vehicles) for a route R2, and is 4 (1×4 vehicles) for a route R3. The navigation device 50 derives that the degree of congestion is the lowest on the route R3. The navigation device 50 also considers the distance, road information and the like for each of the routes together with the degree of congestion in order to derive or decide a sensible route for the vehicle M-1 to reach the destination G.

The target lane determination section 110 may also derive the degree of congestion of each lane as described above based on the traffic information, and based on the derived degree of congestion, determine the most sensible lane for travel to the destination.

It is possible to omit some of the processing in which an image corresponding to the traffic information 282 is displayed on the display device 82 (step S120), the processing to change the automated driving control based on the traffic information 282 (step S122), or the processing to derive a route to the set destination based on the traffic information 282 (step S124).

According to the above processing, the vehicle control system 100 is capable of sharing information with high utility due to transmitting to the server device 260 the vehicle position information, the vehicle surroundings information, and information indicating the automated driving execution status. Moreover, the server device 260 is capable of sharing information with high utility due to generating the traffic information 282 based on the information transmitted from vehicles, and providing the generated traffic information 282 to the vehicles. For example, if the vehicle control system 100 transmits information to the server device 260 with a short periodicity, the server device 260 is capable of transmitting appropriate traffic information in real time, for example, enabling sharing information with higher utility.

Figure 20:
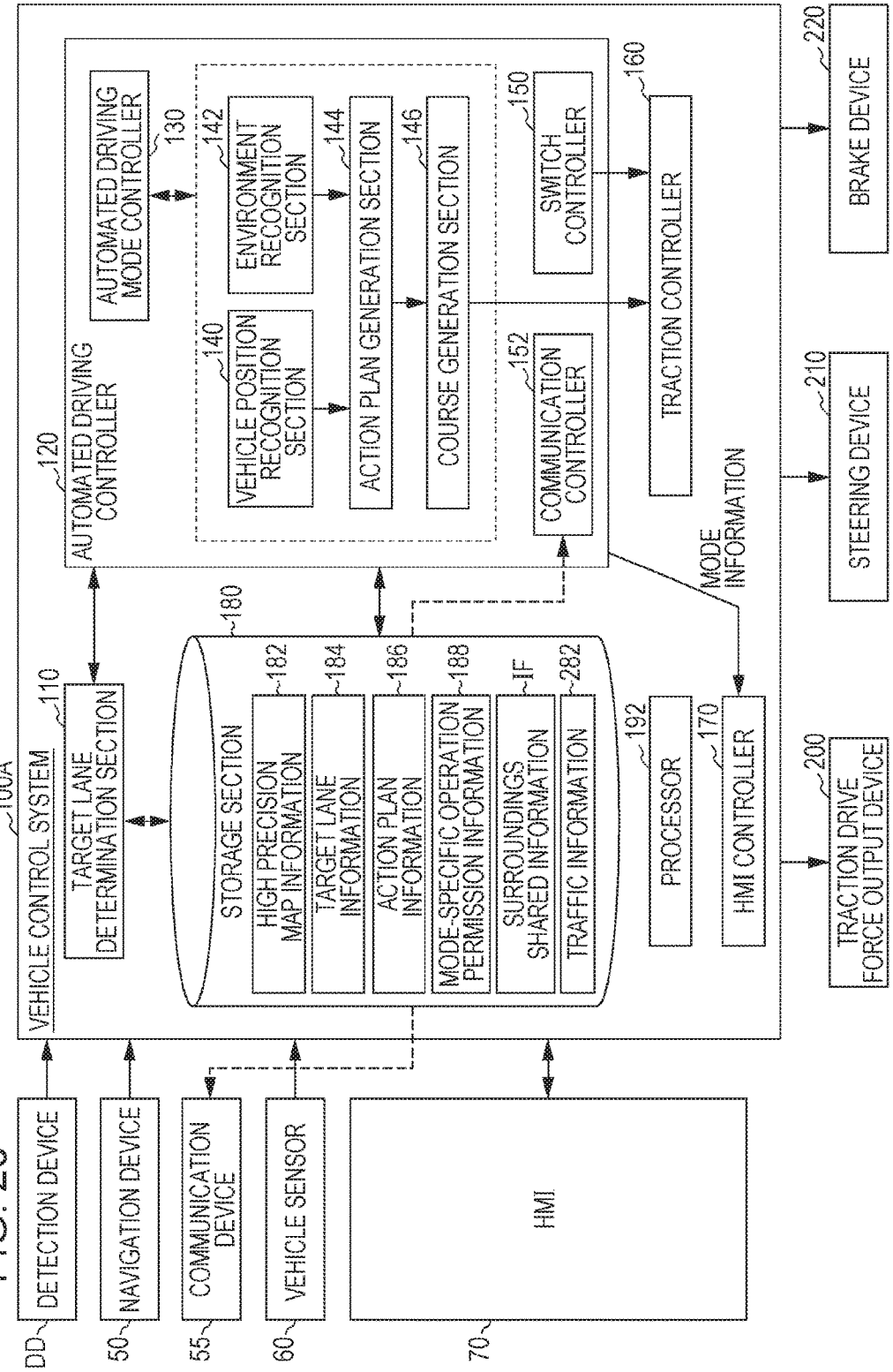
FIG. 20 is a diagram illustrating an example of functional configuration of a vehicle provided with functionality equivalent to functionality of a server device.

Note that in the examples described above, explanation has been given in which the server device 260 manipulates the surroundings shared information IF to generate the traffic information 282. However, a vehicle control system 100A may generate the traffic information 282. In such cases, the functionality of the server device 260 is provided to the vehicle control systems 100A of the vehicle M-1 to the vehicle M-k. FIG. 20 is a diagram illustrating an example of functional configuration of a vehicle M provided with functions equivalent to those of the server device 260. Explanation follows regarding sections that differ from the functional configuration illustrated in FIG. 2.

The vehicle control system 100A of the vehicle M includes a processor 192. The functionality of the processor 192 is equivalent to the functionality of the server-side processor 290. The storage section 180 is stored with the surroundings shared information IF and the traffic information 282.

More specifically, the processor 192 stores the surroundings shared information IF transmitted from each vehicle in the storage section 180. The processor 192 processes the surroundings shared information IF stored in the storage section 180 to render the traffic information 282. Moreover, when the processor 192 acquires a request signal transmitted from another vehicle, in response to the acquired request signal, the processor 192 transmits specific traffic information 282 to the vehicle that transmitted the request signal.

As described above, the traffic information 282 may be generated by the vehicle M or by the server device 260. In cases in which the traffic information 282 is generated by the vehicle M, the traffic information 282 may be employed by the vehicle control system 100 of the vehicle M, and may also be transmitted to other vehicles.

Moreover, the communication controller 152 of the vehicle control system 100A may be omitted. In such cases, the vehicle M does not transmit the surroundings information or information indicating the automated driving execution status of the vehicle M. However, surroundings information and information indicating the automated driving execution status of other vehicles are acquired from other vehicles, other devices, and the like. The vehicle M also transmits traffic information 282 generated by the processor 192 to the other vehicles, other devices, and the like.

According to the embodiment described above, the vehicle control system 100 is capable of sharing information with high utility due to transmitting the position information, vehicle surroundings information, and information indicating the automated driving execution status of the vehicle M to other vehicles, or to the server device 260.

Explanation has been given regarding an embodiment for implementing the present disclosure. However, the present disclosure is not limited in any way by this embodiment, and various modifications or substitutions may be made in a range not departing from the spirit of the present disclosure. Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

We claim:

1. A vehicle control system comprising:
a surroundings information acquisition section configured to acquire vehicle surroundings information with respect to surroundings of a vehicle;
an automated driving controller configured to execute automated driving of the vehicle in which at least one of speed control and steering control is controlled automatically based on the vehicle surroundings information acquired by the surroundings information acquisition section;
a communication section configured to directly or indirectly communicate with another device located outside the vehicle; and
a communication controller configured to transmit the vehicle surroundings information and information indicating an execution status of the automated driving of the vehicle to the another device using the communication section,
wherein the information indicating the execution status of the automated driving of the vehicle comprises one of:
information indicating whether or not the automated driving is being executed,
information indicating a mode of the automated driving mode being executed,
information indicating a scheduled timing for switching from a manual driving to the automated driving, and
information indicating a scheduled timing for switching from the automated driving to the manual driving,
wherein the vehicle control system further comprises a processor configured to generate traffic information by processing information received by the communication section and transmitted from another vehicle including the another device, the received information including the surroundings information for the another vehicle and the information indicating the execution status of the automated driving in the another vehicle, and
wherein the processor generates the traffic information by processing the surroundings information for the another vehicle and the information indicating the execution status of the automated driving in the another vehicle such that the surroundings information for the another vehicle and the information indicating the execution status of the automated driving in the another vehicle are combined and collated per predetermined category.

2. The vehicle control system according to claim 1, further comprising a display device configured to display an image based on traffic information generated by the processor.

3. The vehicle control system according to claim 1, wherein the automated driving controller executes the automated driving by controlling the at least one of speed control and steering control automatically by using the traffic information generated by the processor.

4. The vehicle control system according to claim 1, further comprising a route determination controller configured to determine a route to a set destination by using the traffic information generated by the processor.

5. A traffic information sharing system comprising:
the vehicle control system according to claim 1; and
a server device including
a server-side vehicle communication section configured to receive vehicle information transmitted by the vehicle control system, the received information including the vehicle surroundings information and the information indicating the execution status of the automated driving, and
a server-side processor configured to generate traffic information by processing the received information acquired by the server-side vehicle communication section, and to cause the server-side vehicle communication section to transmit the generated traffic information.

6. The traffic information sharing system according to claim 5, wherein the vehicle control system further includes a display device configured to display an image based on the traffic information transmitted by the server-side vehicle communication section.

7. The traffic information sharing system according to claim 5, wherein the automated driving controller executes the automated driving by controlling the at least one of speed control and steering control automatically by using the traffic information transmitted by the server-side vehicle communication section.

8. The traffic information sharing system according to claim 5, wherein the vehicle control system further includes a route determination controller configured to determine a route to a set destination by using the traffic information transmitted by the server-side vehicle communication section.

9. A vehicle control method executed by an on-board computer, the method comprising:
executing automated driving of a vehicle in which at least one of speed control and steering control is controlled automatically based on vehicle surroundings information acquired by a surroundings information acquisition section configured to acquire the vehicle surroundings information of the vehicle; and
using a communication section configured to directly or indirectly communicate with another device located outside the vehicle to transmit the vehicle surroundings information and information indicating an execution status of the automated driving of the vehicle to the another device,
wherein the information indicating the execution status of the automated driving of the vehicle comprises one of:
information indicating whether or not the automated driving is being executed,
information indicating a mode of the automated driving mode being executed,
information indicating a scheduled timing for switching from a manual driving to the automated driving, and
information indicating a scheduled timing for switching from the automated driving to the manual driving,
wherein the method further comprises generating traffic information by processing information received by the communication section and transmitted from another vehicle including the another device, the received information including the surroundings information for the another vehicle and the information indicating the execution status of the automated driving in the another vehicle,
wherein the generating step generates the traffic information by processing the surroundings information for the another vehicle and the information indicating the execution status of the automated driving in the another vehicle such that the surroundings information for the another vehicle and the information indicating the execution status of the automated driving in the another vehicle are combined and collated per predetermined category.

10. A non-transitory computer readable medium storing a vehicle control program for causing an on-board computer to execute processing, the processing comprising:

executing automated driving of a vehicle in which at least one of speed control and steering control is controlled automatically based on vehicle surroundings information acquired by a surroundings information acquisition section configured to acquire the vehicle surroundings information of the vehicle; and using a communication section configured to directly or indirectly communicate with another device located outside the vehicle to transmit the vehicle surroundings information and information indicating an execution status of the automated driving of the vehicle to the another device, wherein the information indicating the execution status of the automated driving of the vehicle comprises one of:

information indicating whether or not the automated driving is being executed, information indicating a mode of the automated driving mode being executed, information indicating a scheduled timing for switching from a manual driving to the automated driving, and information indicating a scheduled timing for switching from the automated driving to the manual driving, wherein the processing further comprises generating traffic information by processing information received by the communication section and transmitted from another vehicle including the another device, the received information including the surroundings information for the another vehicle and the information indicating the execution status of the automated driving in the another vehicle, wherein the generating step generates the traffic information by processing the surroundings information for the another vehicle and the information indicating the execution status of the automated driving in the another vehicle such that the surroundings information for the another vehicle and the information indicating the execution status of the automated driving in the another vehicle are combined and collated per predetermined category.

11. The vehicle control system according to claim 4, wherein the information indicating the execution status of the automated driving includes a scheduled timing for switching between a manual driving mode and an automated driving mode.

12. The vehicle control system according to claim 1, wherein the vehicle control system is included in a mobile terminal device.

13. The vehicle control system according to claim 1, wherein the communication section is a communication device connected to the communication controller.

14. The vehicle control system according to claim 1, wherein the traffic information includes a position of the another vehicle, a traveling direction of the another vehicle, a traveling lane of a road of the another vehicle, and the execution status of the automated driving of the another vehicle.

15. The vehicle control system according to claim 14, further comprising a route determination controller configured to determine a route to a set destination by using the traffic information generated by the processor, wherein the route determination controller calculates traffic congestion by using the traffic information such that the another vehicle which is executing the automated driving has lower possibility to cause the traffic congestion than the possibility by the another vehicle which is not executing the automated driving.

16. The vehicle control system according to claim 14, wherein the automated driving controller predicts behavior of the another vehicle by using the traffic information, and changes an action plan in the automated driving in accordance with the predicted behavior.

17. A traffic information sharing system comprising:
a vehicle control system; and
a server device,
wherein the vehicle control system comprises:
a surroundings information acquisition section configured to acquire vehicle surroundings information with respect to surroundings of a vehicle;
an automated driving controller configured to execute automated driving of the vehicle in which at least one of speed control and steering control is controlled automatically based on the vehicle surroundings information acquired by the surroundings information acquisition section;
a communication section configured to directly or indirectly communicate with another device located outside the vehicle; and
a communication controller configured to transmit the vehicle surroundings information and information indicating an execution status of the automated driving of the vehicle to the another device using the communication section,
wherein the information indicating the execution status of the automated driving of the vehicle comprises one of:
information indicating whether or not the automated driving is being executed,
information indicating a mode of the automated driving mode being executed,
information indicating a scheduled timing for switching from a manual driving to the automated driving, and
information indicating a scheduled timing for switching from the automated driving to the manual driving,
wherein the server device comprises:
a server-side vehicle communication section configured to receive information transmitted by the vehicle control system, the received information including the vehicle surroundings information and the information indicating the execution status of the automated driving, and
a server-side processor configured to generate traffic information by processing the received information acquired by the server-side vehicle communication section, and to cause the server-side vehicle communication section to transmit the generated traffic information,
wherein the server-side processor generates the traffic information by processing the surroundings information and the information indicating the execution status of the automated driving such that the surroundings information and the information indicating the execution status of the automated driving are combined and collated per predetermined category.

* * * * *